United States Patent
Connors

(10) Patent No.: US 10,920,909 B2
(45) Date of Patent: Feb. 16, 2021

(54) PIPE PROTECTOR

(71) Applicant: 1552818 ONTARIO LIMITED, London (CA)

(72) Inventor: Geoff Weyman Connors, London (CA)

(73) Assignee: 1552818 ONTARIO LIMITED, London (CA)

( * ) Notice: Subject to any disclaimer, the term of this patent is extended or adjusted under 35 U.S.C. 154(b) by 0 days.

(21) Appl. No.: 16/650,127

(22) PCT Filed: Sep. 20, 2018

(86) PCT No.: PCT/CA2018/051172
§ 371 (c)(1),
(2) Date: Mar. 24, 2020

(87) PCT Pub. No.: WO2019/056104
PCT Pub. Date: Mar. 28, 2019

(65) Prior Publication Data
US 2020/0284377 A1 Sep. 10, 2020

Related U.S. Application Data

(60) Provisional application No. 62/562,645, filed on Sep. 25, 2017.

(51) Int. Cl.
*F16L 1/11* (2006.01)
*F16L 59/02* (2006.01)
*F17D 5/00* (2006.01)

(52) U.S. Cl.
CPC .............. *F16L 1/11* (2013.01); *F16L 59/024* (2013.01); *F17D 5/005* (2013.01)

(58) Field of Classification Search
CPC ... F16L 1/11; F16L 57/00; F16L 58/00; F16L 59/024; F17D 5/005

(Continued)

(56) References Cited

U.S. PATENT DOCUMENTS

| 4,199,011 A | 4/1980 | Kreft et al. | |
| 5,038,834 A * | 8/1991 | Siegfried | E04C 5/10 138/173 |

(Continued)

FOREIGN PATENT DOCUMENTS

| CA | 1090691 A | 12/1980 |
| CN | 203010112 U | 6/2013 |

(Continued)

OTHER PUBLICATIONS

International Search Report (2 pages) dated Dec. 18, 2018 from corresponding PCT/CA2018/051172.

(Continued)

*Primary Examiner* — Patrick F Brinson
(74) *Attorney, Agent, or Firm* — Brinks Gilson & Lione; John C. Freeman

(57) ABSTRACT

A pipeline shield is formed of modular pipeline shield panels into a generally tubular shape to fittingly envelope a pipeline. Each panel is formed of a rectangular sheet of durable material formed or formable into an arcuate shape having longitudinal ribs projecting radially from a surface of the sheet and defining longitudinal valleys, and coupling means configured for secure assembly with other modular pipeline shield panels to form the pipeline shield. The pipeline shield reduces or prevents damage from impact or abrasion when the pipeline is lowered into a trench and buried. The longitudinal ribs may extend an entire length of the panel, or may be less than an entire length of the panel and longitudinally staggered to facilitate rolling of the pipeline in a roller cradle during installation. Drainage holes provide for drainage of liquid away from the pipeline or to provide a path for cathodic protection current.

21 Claims, 18 Drawing Sheets

(58) Field of Classification Search
USPC .................................. 138/110, 156, 158, 173
See application file for complete search history.

(56) References Cited

U.S. PATENT DOCUMENTS 8,119,047 B2 * 2/2012 Moore .................... E21B 17/12
264/242
10,710,325 B2 * 7/2020 Olah .................. E21B 17/1007

FOREIGN PATENT DOCUMENTS

EP 0546934 A1 6/1993
FR 2924197 A1 5/2009

OTHER PUBLICATIONS

Written Opinion (5 pages) dated Dec. 18, 2018 from corresponding PCT/CA2018/051172.
Article 34 Amendment (13 pages) filed Jul. 24, 2019 from corresponding PCT application PCT/CA2018/051172.
International Preliminary Report (5 pages) on Patentability dated Sep. 17, 2019 from corresponding PCT application PCT/CA2018/051172.

* cited by examiner

PIPE PROTECTOR

This application is a National Stage application of International Application No. PCT/CA2018/051172, filed Sep. 20, 2018, which claims priority under 35 U.S.C. § 119(e) to U.S. Provisional Patent Application Ser. No. 62/562,645, filed on Sep. 25, 2017, the entire contents of each of which are incorporated herein by reference.

BACKGROUND OF THE INVENTION

Field of the Invention

The present disclosure relates generally to techniques for protecting pipelines in buried pipeline installations, including particularly oil and gas pipeline installations.

Description of the Related Art

Buried pipelines are widely used to transport fluids including, but not limited to, crude and refined petroleum, fuel oil, natural gas, water, sewage, ammonia, hydrogen gas, ethanol, and coal or ore slurries. Pipelines are often formed of steel or plastic, and are buried to protect the pipeline from external damage and to maintain them in a stable and predictable environment.

Often, a pipeline is installed by first digging a trench of suitable width and depth, placing the pipeline in the trench, and backfilling the pipeline trench with either the excavated material or other suitable materials including sand, soil, gravel, or rocks. Often, placement of the pipeline in the trench is performed using pipe slings or rolling cradles. These fixtures involved heavy equipment bearing a crane suspending a cradle configured with rollers which, when supporting the pipeline, permit longitudinal movement of the pipeline. The cradle typically has a number of rollers aligned semi-circularly to conform to a lower semi-circular surface of the pipeline.

The procedure of burying pipelines can present certain risks, however, to the structural integrity of the buried pipes, including damage to the pipes during placement and backfilling, or after backfilling is complete, particularly in rocky areas. Such damage can occur as a result of impact or abrasion from external materials, containing rocks, or from the direct placement of the pipe onto a rocky trench bottom. In addition, if proper, long term groundwater drainage is not provided, corrosion could occur at any defect in the coating.

As such, a number of methods have been employed to protect buried pipes from these risks, including, for example, the use of wooden slats, concrete coatings, and compacted sand beds and padding. In particular, three common methods of protecting the pipe include: providing a compacted sand bedding and sand backfill; the use of a layer or covering of wood lagging, which may be strapped together via steel cables; and providing a concrete layer about the pipeline, which is typically applied or installed offsite or in a plant.

Such known techniques, while addressing some of the requirements involved, nevertheless suffer from certain shortcomings, including in different instances increased cost through cost of materials and installation time, complexity of method by requiring the performance of different steps at different times in the installation process and in different places, insufficient protection of the pipeline against hazards such as impact or abrasion, and insufficient drainage of water away from the pipeline resulting in corrosion, among others.

There remains, therefore, a need for improved techniques to protect buried pipelines which addresses at least some of the shortcomings, provides yet further advantages, and thus provides a material value over prior techniques.

BRIEF DESCRIPTION OF THE DRAWINGS

Embodiments will now be described, by way of example only, with reference to the attached Figures.

Figure 1:
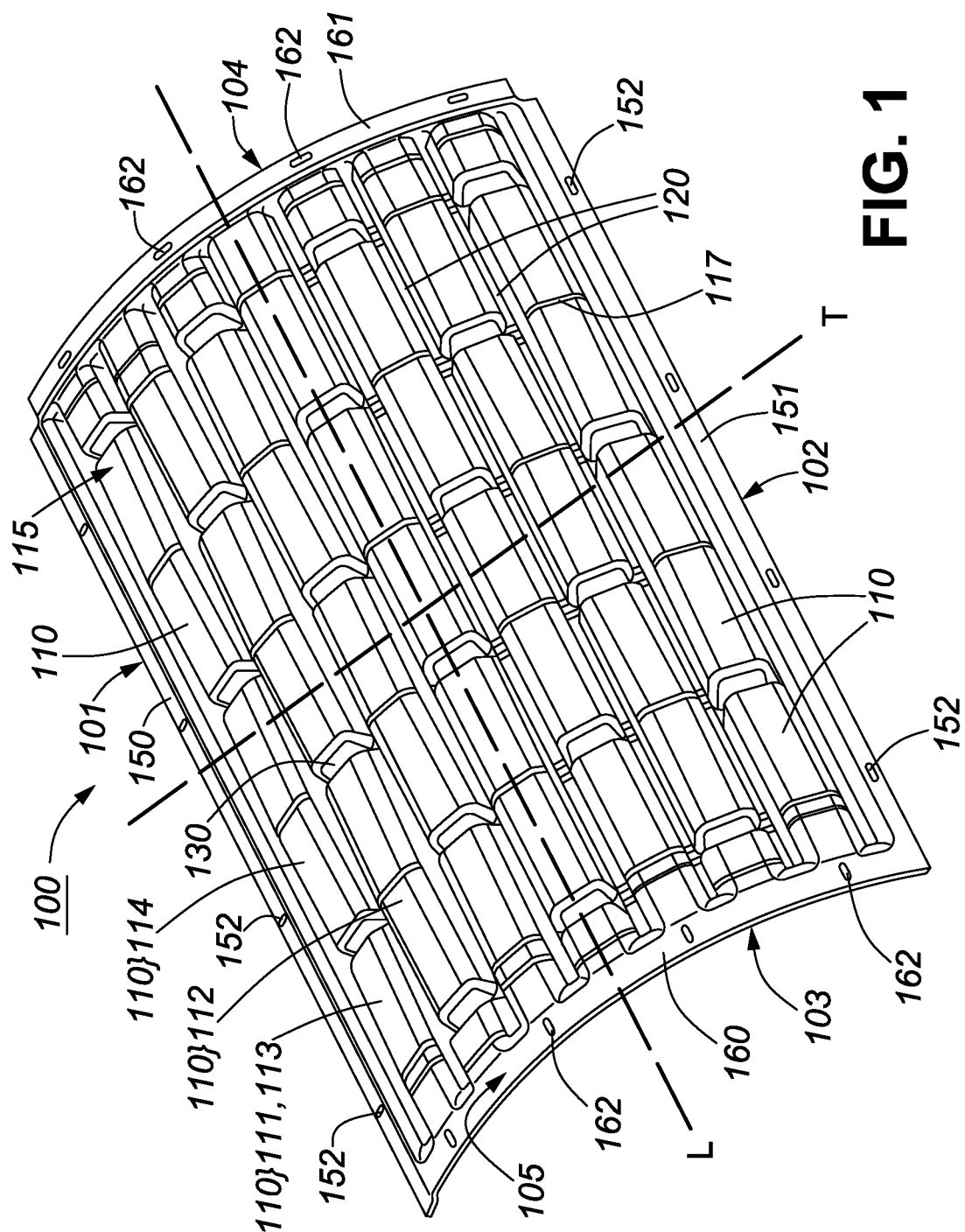
FIG. 1 shows an upper perspective view of a modular pipeline shield panel according to embodiments of the invention.
Figure 2:
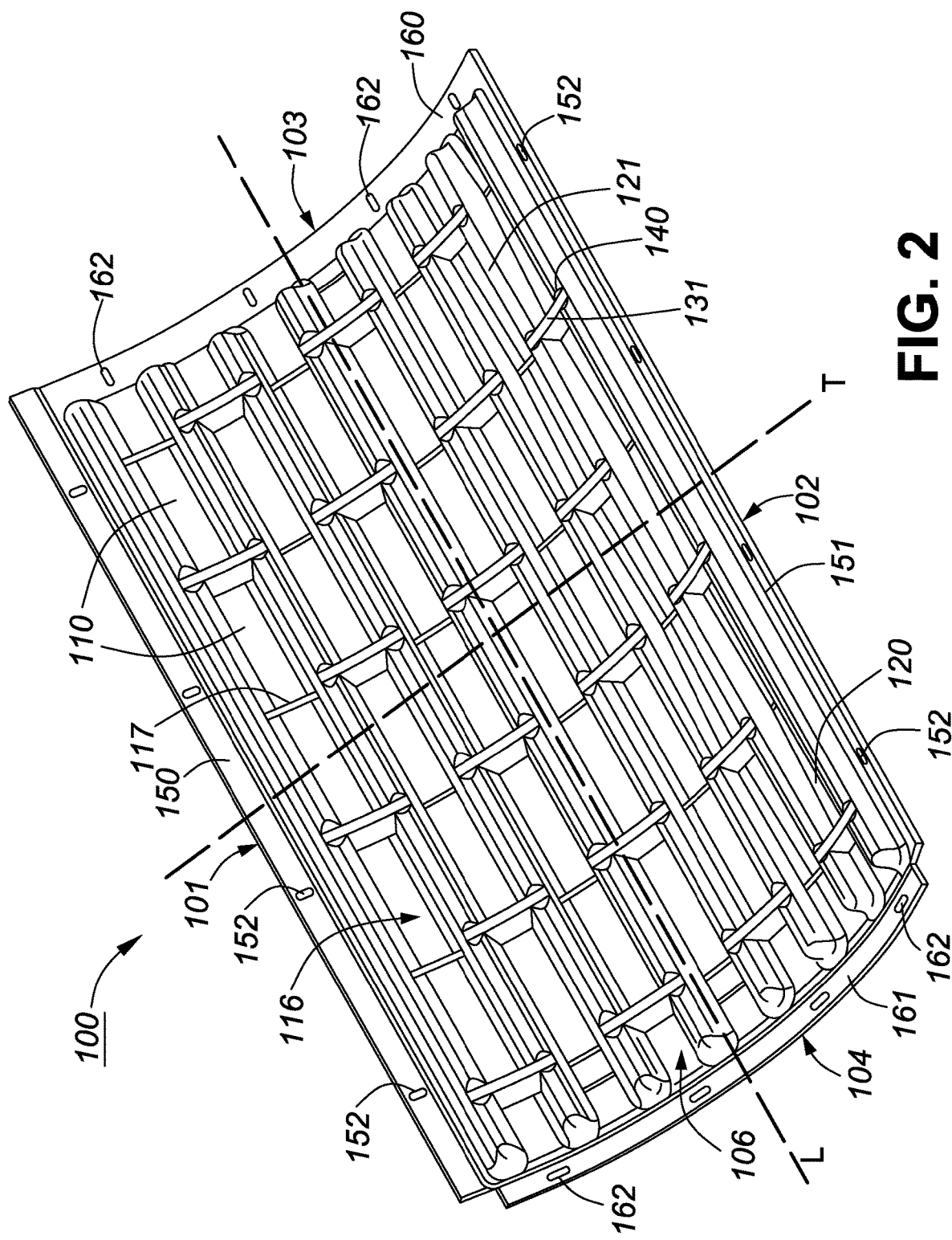
FIG. 2 shows a lower perspective view of the modular pipeline shield panel of FIG. 1.
Figure 3:
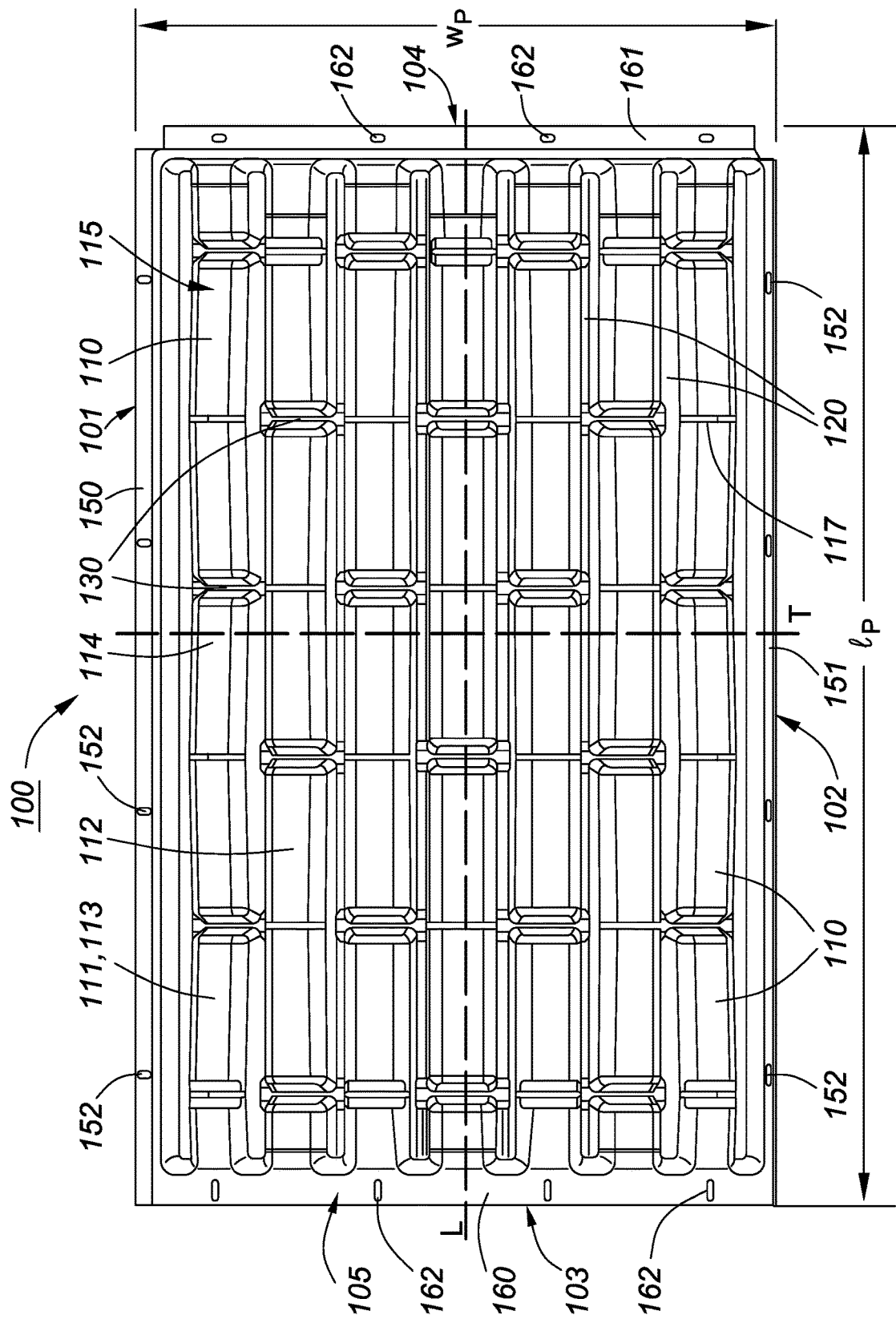
FIG. 3 shows a top plan view of the modular pipeline shield panel of FIG. 1.
Figure 4:
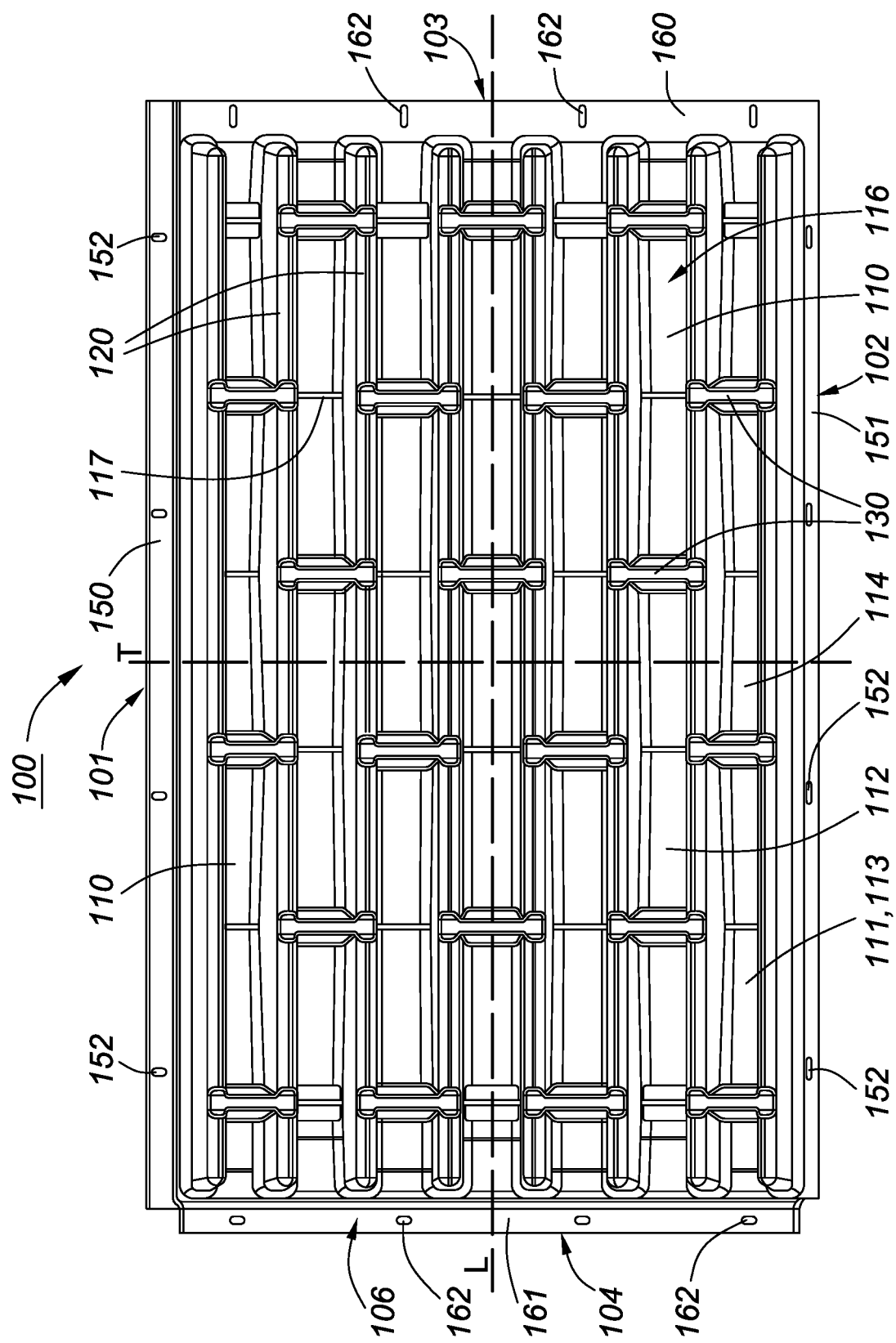
FIG. 4 shows a bottom plan view of the modular pipeline shield panel of FIG. 1.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DESCRIPTION

Improved techniques for protecting pipelines in buried pipeline installations are disclosed herein. The techniques include, but are not limited to: a modular pipeline shield panel; a pipeline shield formed from a plurality of the modular pipeline shield panels, or a single shield panel which encircles the pipeline; and a method of protecting a pipeline in a buried pipeline installation.

FIGS. 1-8 show embodiments of a modular pipeline shield panel, or simply panel 100. The panel 100 has a generally rectangular profile as seen from above, as seen particular in FIGS. 3 & 4. The panel is curved to accommodate the appropriate pipe geometry, as shown particularly in FIGS. 5, 6 & 11. The panel 100 has a longitudinal axis L and a transverse axis T perpendicular to the longitudinal axis L. A first dimension of the panels 100 along the longitudinal axis L is a panel length $l_P$, shown in FIG. 3. A second dimension of the panel 100 along the transverse axis T is a panel width $w_P$, also shown in FIG. 3. The panel length $l_P$ may be greater than, or less than, the panel width $w_P$, or they may be generally equal, in which case the panel 100 has a generally square shape. In some embodiments, the panel length p is between 50 cm and 200 cm, or between 75 cm and 150 cm, or between 91.5 cm and 122 cm, or about 100 cm. In some embodiments, the panel length $l_P$ is no greater than 121.8 cm, which may facilitate shipping. In some embodiments, the panel width $w_P$ is between 20 cm and 100 cm, or between 40 cm and 60 cm, or between 50 cm and 56 cm, or about 53 cm. The panel 100 also has a radial axis R orthogonal to the longitudinal axis L and the transverse axis T, and a third dimension of the panel 100 along the radial axis R is a panel height hp, shown in FIG. 6. In some embodiments, the panel height hp is between 1 cm and 10 cm, or between 2 cm and 7 cm, or between 3.8 cm and 5.2 cm, or about 4.5 cm.

Figure 6:
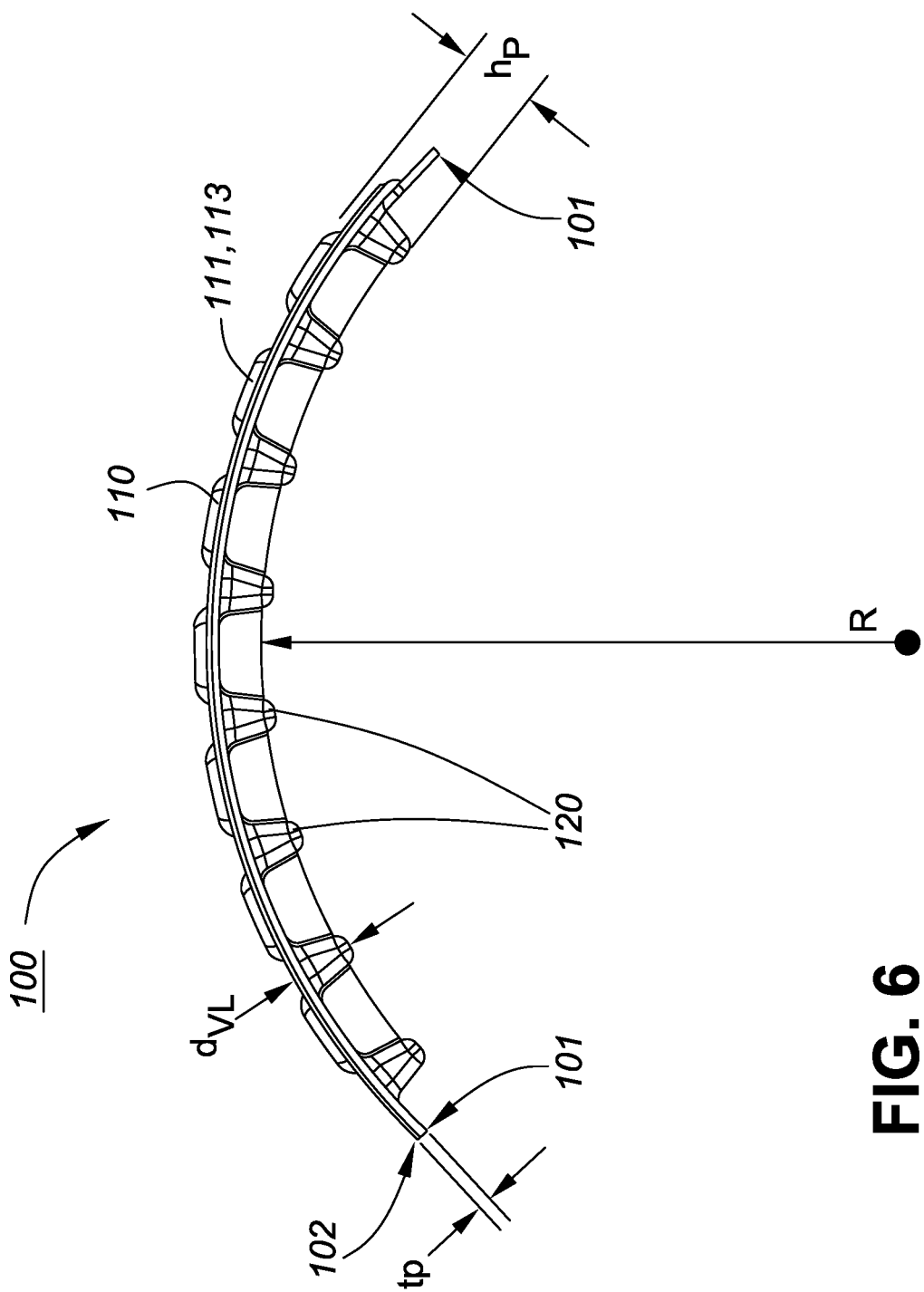
FIG. 6 shows a second end elevation view of the modular pipeline shield panel of FIG. 1.
Figure 7:
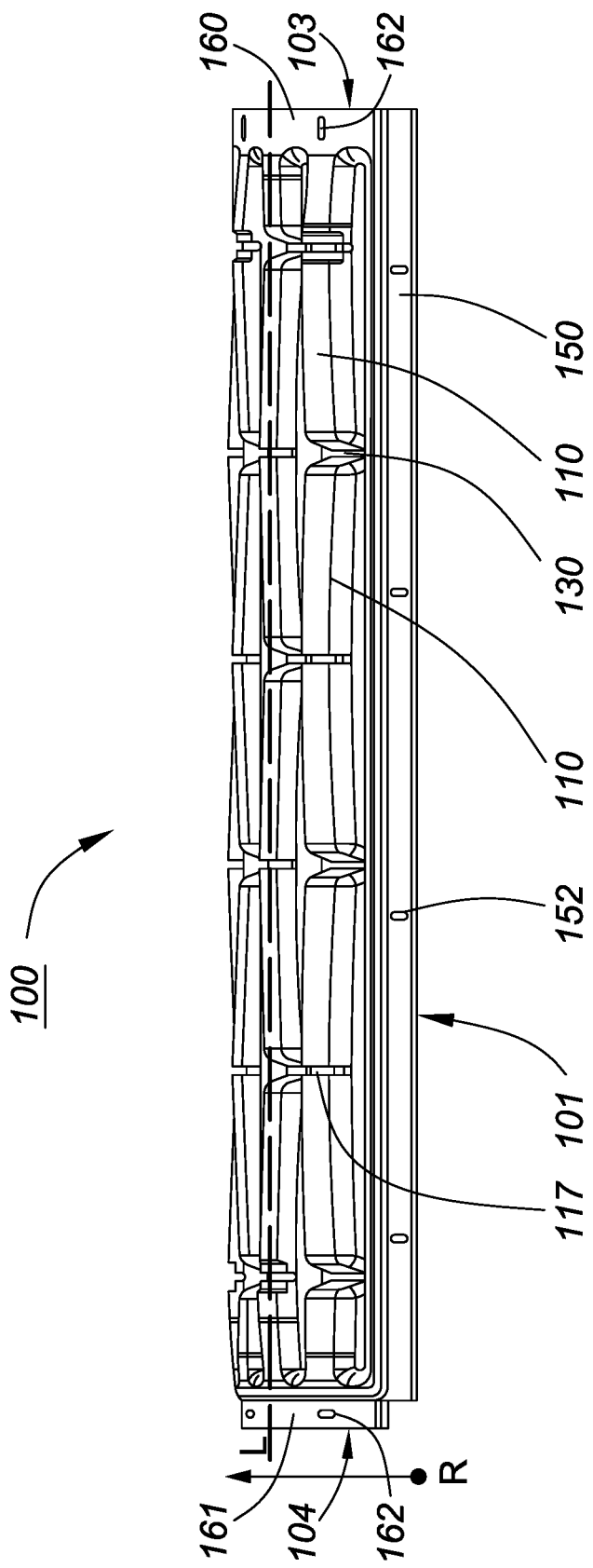
FIG. 7 shows a left side elevation view of the modular pipeline shield panel of FIG. 1.
Figure 8:
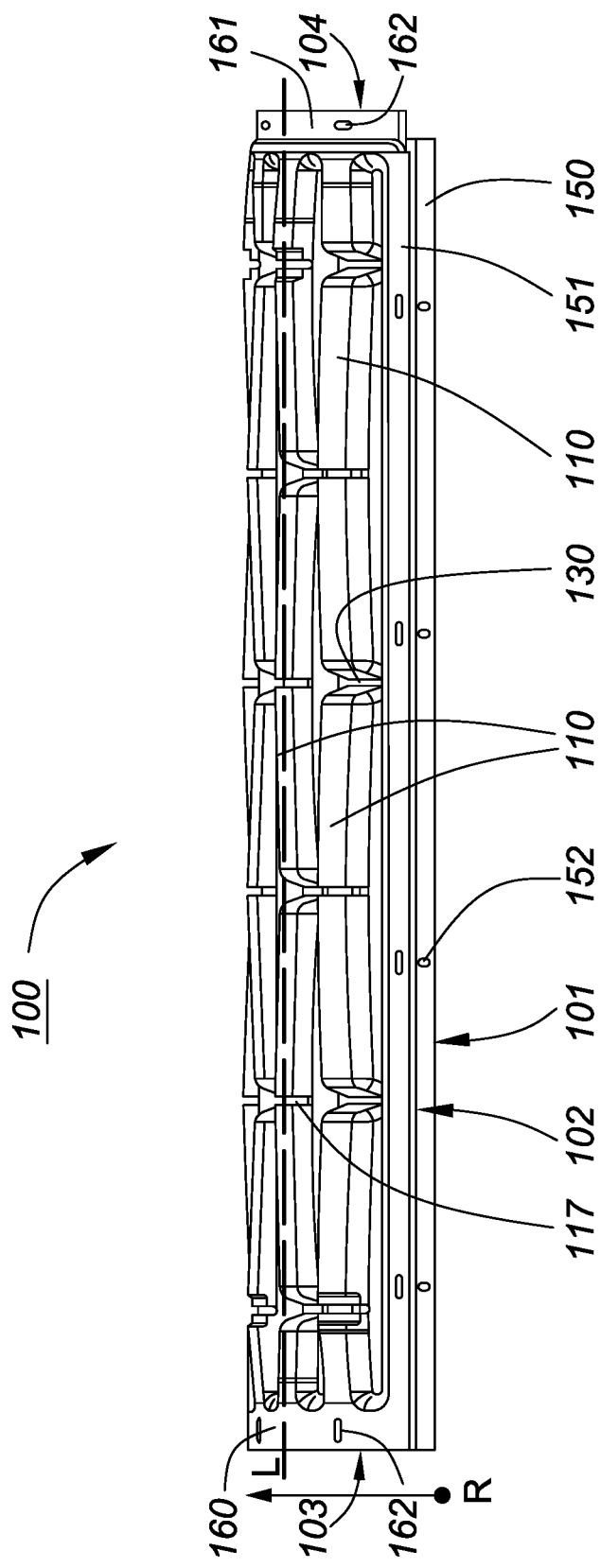
FIG. 8 shows a right side elevation view of the modular pipeline shield panel of FIG. 1.

The panel 100 is formed of a sheet of material having a panel thickness $t_P$, shown in FIG. 6. The material may be any durable, rugged material, and in some embodiments, is a plastic, which may be a thermoplastic, which may be high-density polyethylene. Other materials are possible. In some embodiments, the panel thickness $t_P$ is between 3 mm and 15 mm, or between 5 mm and 12 mm, or between 6.35 mm and 9.53 mm, or about 8 mm.

The panel 100 may be formed from the material to form the features described herein using any suitable fabrication technique. In some embodiments, the panel 100 is formed from the material by injection moulding, compression moulding, or extrusion.

Figure 11:
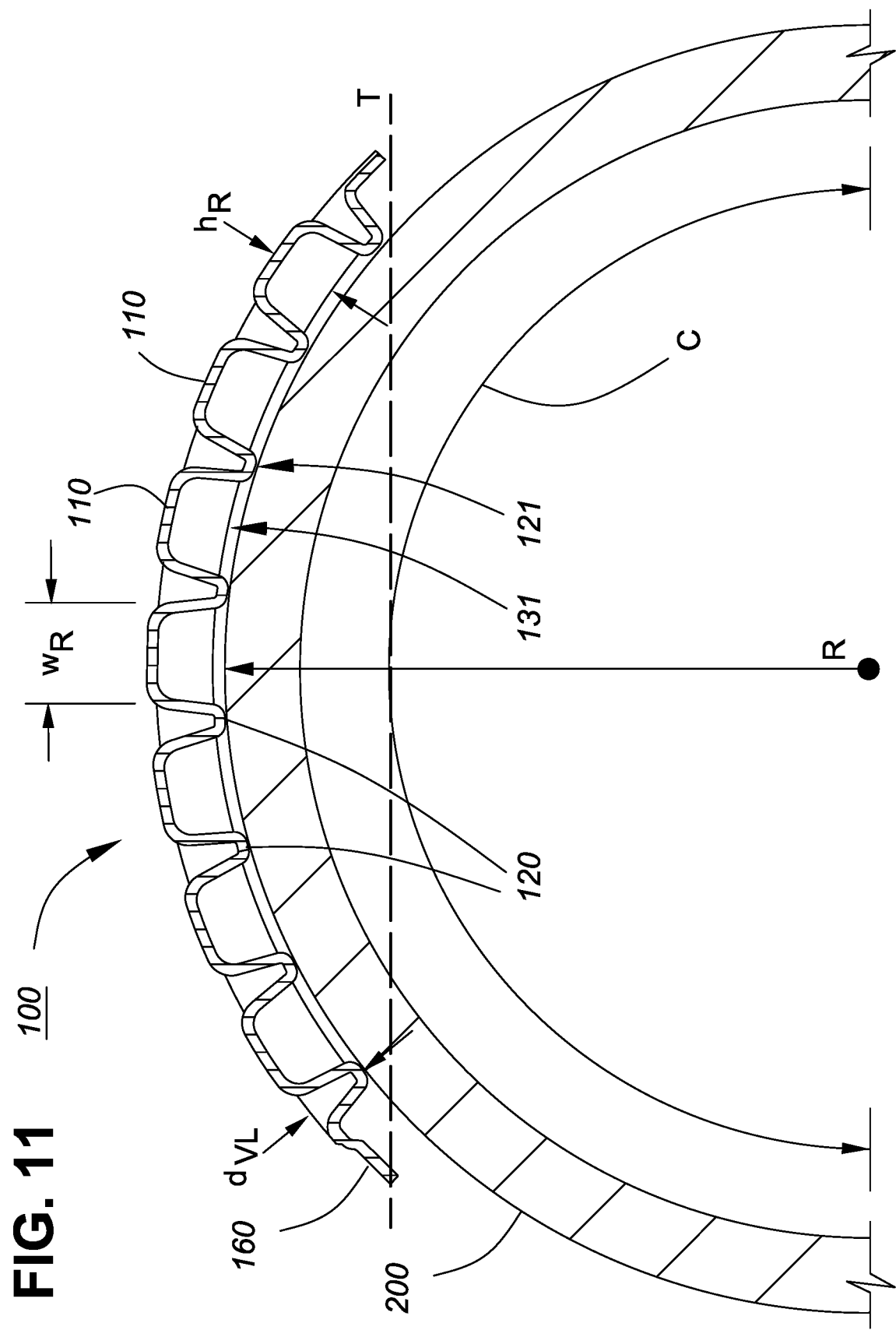
FIG. 11 shows a transverse cross-sectional view of a modular pipeline shield panel applied to a pipeline.

The panel 100 may be formed with a generally arcuate shape representing a hollow cylinder segment, or tube segment, and having a curvature C, shown particularly in FIG. 11, along the transverse axis T which is generally equal to a curvature C of a pipeline 200 to which the panel 100 is to be conformingly applied. Accordingly, the panel 100 may be formed from such a material and using such a technique as to render the panel 100 generally rigid and having a generally arcuate shape having the curvature C selected to match the curvature C of the pipeline to which the panel 100 is intended to be conformingly applied. Alternatively, the panel 100 may be formed from such a material and using such a technique as to render the panel 100 at least partly flexible to bending about its longitudinal axis L and along its transverse axis T to form the panel 100 into the generally arcuate shape having the curvature C. In the latter embodiment, the curvature C need not be preselected, and the flexibility of the panel 100 may enable bending of the panel 100 into generally arcuate shapes having different curvatures C when conformingly applied to pipelines having different curvatures C.

Figure 12:
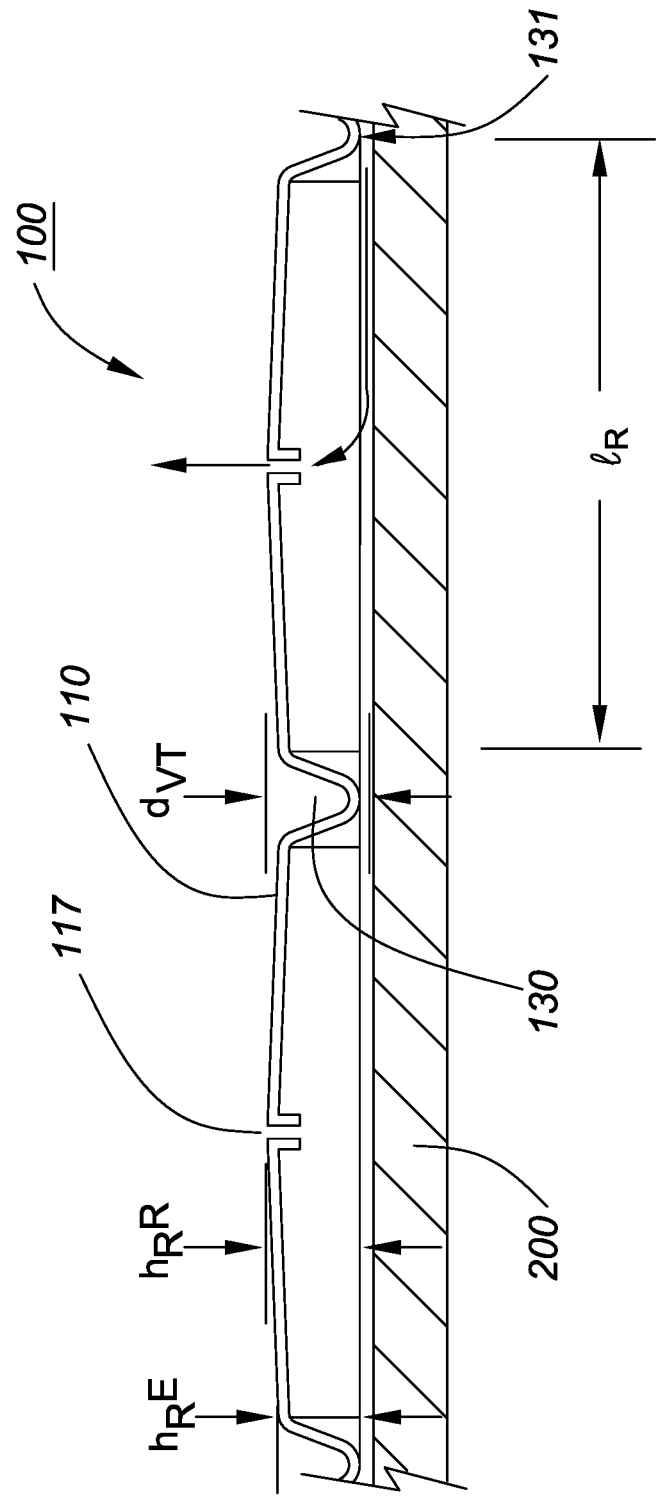
FIG. 12 shows a longitudinal cross-sectional view of a modular pipeline shield panel applied to a pipeline.

The panel 100 is formed with a plurality of reliefs or embossments, which may be termed ribs 110, each having a generally rectangular shape. Transversely adjacent ribs 111, 112 are separated by a longitudinal valley 120, and longitudinally adjacent ribs 113, 114 are separate by a transverse valley 130. As shown in FIG. 11, the longitudinal valley 120 has a longitudinal valley depth $d_{VL}$ along the radial axis R. As shown in FIG. 12, the transverse valley 130 has a transverse valley depth $d_{VT}$ along the radial axis R.

While the embodiments of the panel 100 generally shown and described herein have reliefs or embossments which are ribs having a generally rectangular shape, in other embodiments the reliefs or embodiments may have other shapes, including without limitation hexagons or ovals, likewise separated by valleys. In all such embodiments, the principles set forth herein are equally applicable with any modifications that may be required.

Each rib has a rib length $l_R$, shown particularly in FIG. 12, along the longitudinal axis L, a rib width $w_R$, shown particularly in FIG. 11, along the transverse axis T, and a rib height $h_R$, as shown particularly in FIG. 11, along the radial axis R, which may be the same or different for different ribs 110. In some embodiments, the rib length $l_R$ is greater than the rib width $w_R$, while in other embodiments the rib length $l_R$ is approximately equal to the rib width $w_R$, in which case the ribs 110 have a generally square shape. In some embodiments, the ribs 110 extend along the entire length of the panel 100, which may advantageously enable the use of convenient manufacturing techniques including rotational molding or extrusion. In some embodiments, the rib length $l_R$ is between 10 cm and 50 cm, or between 15 cm and 40 cm, or between 23 cm and 36 cm, or about 30 cm. Some of the ribs 110 provided adjacent longitudinal ends of the panel 100 may have a partial length, and in some embodiments may have at a length of at least 3 cm, or at least 5 cm, or at least 7.5 cm. In some embodiments, the rib width $w_R$ is between 3 cm and 12 cm, or between 5 cm and 10 cm, or between 6 cm and 9 cm, or about 7.5 cm. In some embodiments, the rib height $h_R$ is between 2 cm and 7 cm, or between 3 cm and 6 cm, or between 3.8 cm and 5.1 cm, or about 4.5 cm.

In some embodiments, the ribs 110 have an upper surface, shown particular in FIGS. 1 & 5, generally coplanar with an upper surface 105 of the panel 100, and thus the ribs 110 extend below the upper surface 105 of the panel 100. In other embodiments, shown particularly in FIGS. 2 & 4, the ribs 110 have a lower surface 116 generally coplanar with a lower surface 106 of the panel 100, and thus the ribs 110 extend above the lower surface 106 of the panel 100. In some embodiments, the some portion of the ribs 110 extends above the upper surface 105 of the panel, and some portion of the ribs 110 extends below the lower surface 106 of the panel.

In some embodiments, the different ribs 110 on the panel 100 are positioned relative to one another both along the longitudinal axis L and along the transverse axis T such that the ribs 110 are arranged in a preconfigured pattern. For example, in some embodiments groups of the ribs 110 are aligned along the transverse axis T, i.e. have a common longitudinal position, such that the transverse valleys 130 formed between longitudinally adjacent groups of ribs form a continuous transverse valley 130. Similarly, in some embodiments groups of the ribs 110 are aligned along the longitudinal axis L, i.e. have a common transverse position, such that the longitudinal valleys 120 formed between transversely adjacent groups of ribs form a continuous longitudinal valley 120. In embodiments where both of these conditions apply, then the ribs 110 are arranged in a checkerboard or grid pattern, with both continuous longitudinal valleys 120 and continuous transverse valleys 130. In some embodiments, groups of the ribs 110 are aligned transversely, with each group of ribs 110 offset transversely from each longitudinally adjacent group of ribs 110, so as to form continuous transverse valleys 130 and discontinuous longitudinal valleys 120. Alternatively, and as shown in FIGS. 1-4, in some embodiments, groups of the ribs 110 are aligned longitudinally, with each group of ribs 110 offset longitudinally from each transversely adjacent group of ribs 110, so as to form continuous longitudinal valleys 120 and discontinuous transverse valleys 130. In either case, the ribs 110 are arranged in a staggered pattern.

Figure 9:
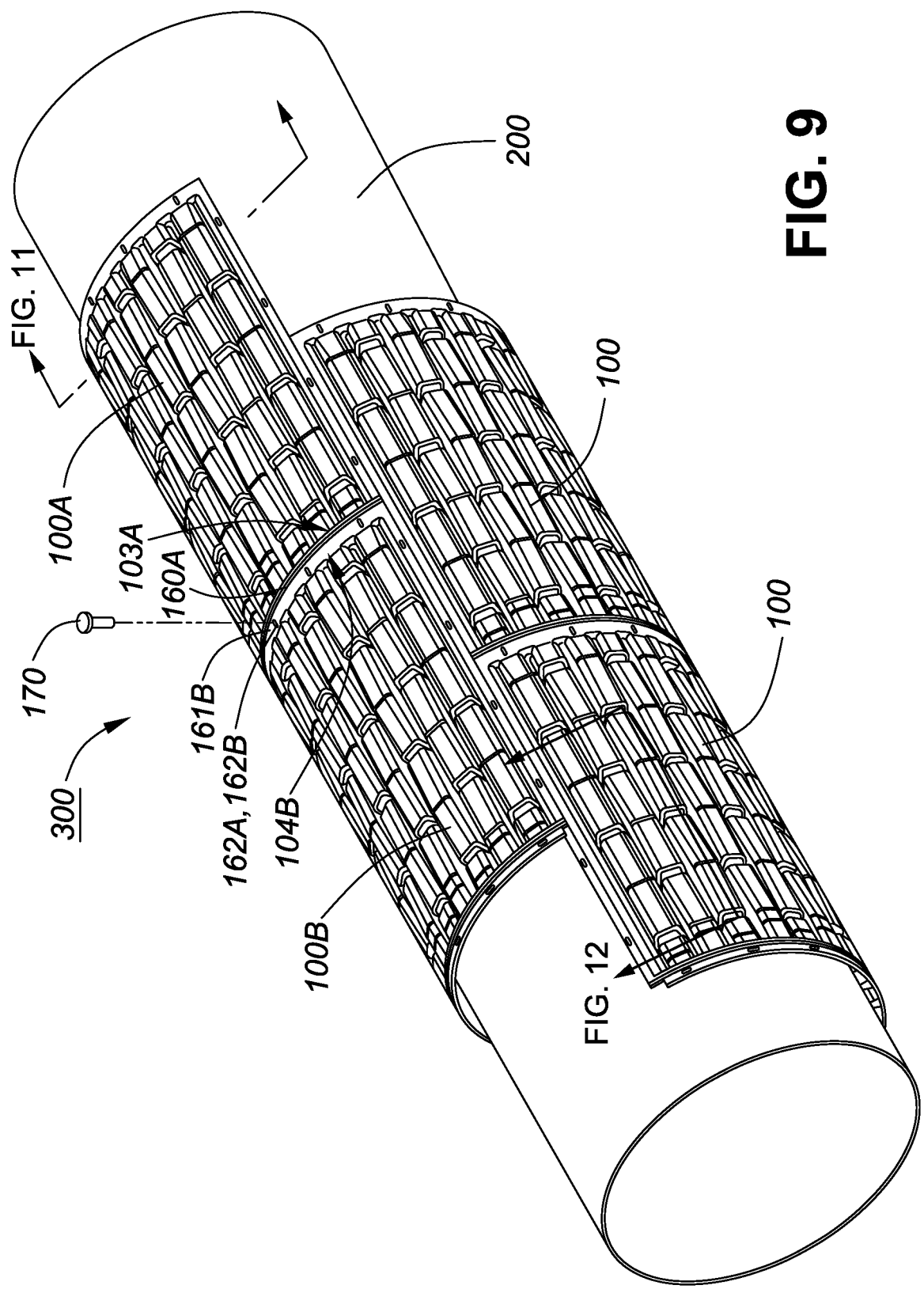
FIG. 9 shows an upper perspective view of a pipeline shield applied to a pipeline, where the modular pipeline shield panels are staggered longitudinally.
Figure 10:
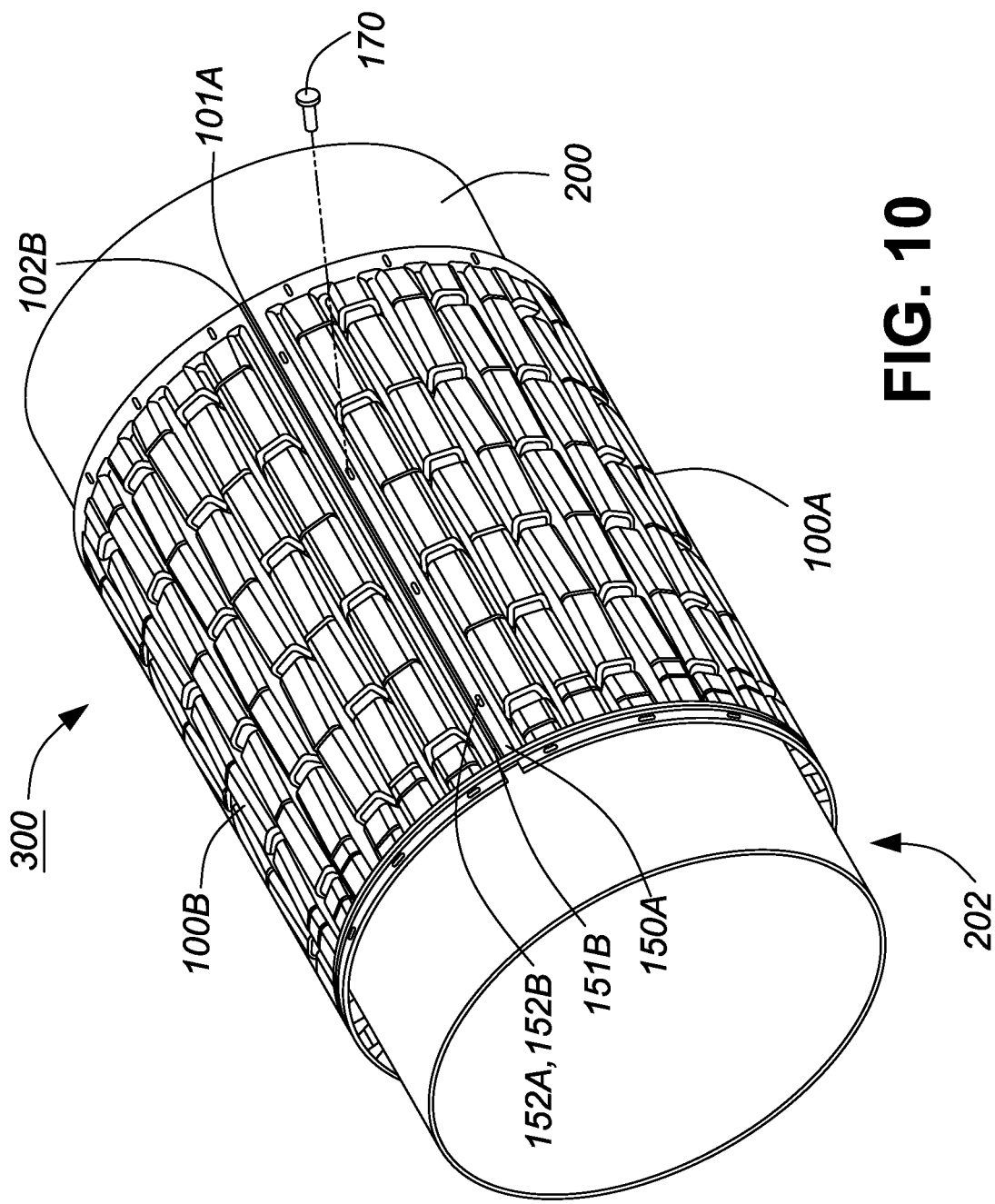
FIG. 10 shows an upper perspective view of a pipeline shield applied to a pipeline, where the modular pipeline shield panels are aligned longitudinally.

A plurality of the panels 100 may be assembled to form a pipeline shield 300 fittingly enveloping and protecting a pipeline 200, as shown in FIGS. 9 & 10. The plurality of panels 100 may be mated and fastened at abutting edges to form the pipeline shield 300 having a generally tubular shape. When the panels 100 are rigidly arcuate, then the panels 100 are selected to have a curvature C which matches a curvature C of the pipeline 200, such that the pipeline shield 300, once formed from the panels 100, fittingly envelopes the pipeline 200. When the panels 100 are flexible, then formation of the pipeline shield 300 may include bending the panels 100 into an arcuate shape having the curvature C of the pipeline 200, which may be before application of the panel 100 to the pipeline 200, or as part of the application of the shield to the pipeline 200, e.g. by pressing the panel 100 against the pipeline 200 to bend the panel 100 into the arcuate shape.

In other to enable rugged modular assembly of the panels 100 into the pipeline shield 300, each panel 100 may be formed at transversely opposite longitudinal edges 101, 102 with longitudinal mating ridges 150, 151, and at longitudinally opposite transverse edges 103, 104 with transverse mating ridges 160, 161. The mating ridges 150, 151, 160, 161 may each be formed with a plurality of spaced holes or slots sized and shaped to fittingly receive fastening plugs 170. Thus, the longitudinal mating ridges 150, 151 may be formed with holes 152, and the transverse mating ridges 160, 161 may be formed with holes 162. The placement and spacing of the holes 152, 162 may enable overlapping alignment of the holes 152, 162 in adjacent mating ridges 150, 151, 160, 161 of two panels 100 when their respective mating ridges 150, 151, 160, 161 are overlapped. As shown in FIG. 10, the fastening plugs 170 may be inserted into the overlapping holes 152, 162 thereby fastening the two panels 100 together at their adjacent edges 101, 102, 103, 104. The plugs may be formed of any durable, rigid material, and in some embodiments if formed of nylon.

Thus, when, as shown in FIG. 10, two panels 100A, 100B are positioned side-by-side along respectively opposing longitudinal edges 101A, 102B, the longitudinal mating ridge 150A of one panel 100A may overlap the longitudinal mating ridge 151B of the other panel 100B, with the plugs 170 received in the holes 152A, 152B to fasten the panels 100A, 100B together. Alternatively, as shown in FIG. 9, when panels 100A, 100B are positioned end-to-end along respectively opposing transverse edges 103A, 104B, the transverse mating ridge 160A of one panel 100A may overlap the transverse mating ridge 161B of the other panel 100B, and plugs may be inserted into the holes 162A, 162B to fasten the panels 100A, 100B together. The holes 152, 162 and plugs may be sized and shaped such that the plugs may be received in the holes 152, 162 with relative ease, but removal of the plugs from the holes 152, 162 requires a preconfigured amount of force, such that the plugs are effectively detained in the holes, and the panels 100 so assembled remain durably assembled and resistant to disassembly by incidental impacts and forces experienced during the pipeline installation.

Figure 5:
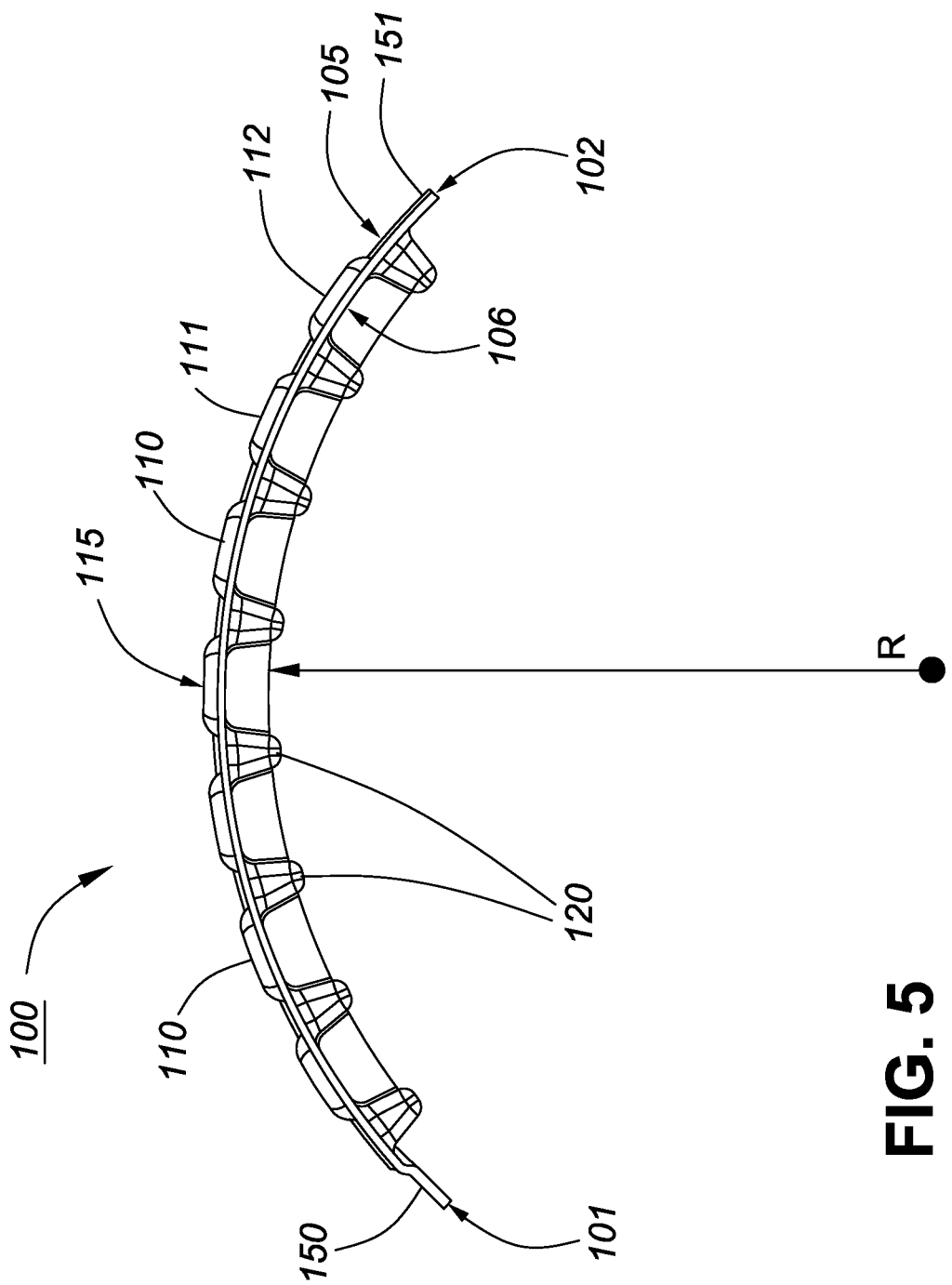
FIG. 5 shows a first end elevation view of the modular pipeline shield panel of FIG. 1.

The longitudinal mating ridges 150 and transverse mating ridges 160 formed with holes 152, 162, and thus intended to overlap the corresponding longitudinal mating ridges 151 and transverse mating ridges 161, respectively, may be raised relative the latter, or the latter lowered relative to the former, as shown particularly in FIGS. 5 & 6, so as to provide a gap beneath the longitudinal mating ridges 150 and transverse mating ridges 160 sized and shaped to fittingly receive the corresponding longitudinal mating ridges 151 and transverse mating ridges 161 in overlapping fashion.

The holes 152, 162 and plugs may be provided with a uniform preconfigured spacing such that adjacent panels 100 may be assembled and joined with any desired offset equaling one or a multiple of the spacing. Thus, as shown in FIG. 10, a plurality of the panels 100 may be arranged, assembled, and joined in a regular grid pattern, with longitudinal alignment of the longitudinal edges 101, 102 of longitudinally adjacent panels 100A, 100B, and transverse alignment of the transverse edges 103, 104 of transversely adjacent panels 100. Alternatively, adjacent panels 100 may be offset longitudinally or transversely by any desired multiple of the plug/hole spacing. For example, as shown in FIG. 9, transversely adjacent panels 100 may be staggered one-half the panel length $l_P$.

While the embodiments of the panel 100 and pipeline shield 300 generally shown and described herein having mating ridges, holes, and plugs in order to assemble multiple panels 100 into a pipeline shield 300, in other embodiments the panels are provided with alternative means which enable rugged and reversible assembly of adjacent panels at abutting or adjacent edges, including without limitation fasteners, including hook-and-loop fasteners, such as Velcro™, straps, buckles, snaps, slots, or any suitable alternative. In all such embodiments, the principles set forth herein are equally applicable with any modifications that may be required.

In some embodiments, the longitudinal valley depth $d_{VL}$ is equal to the transverse valley depth $d_{VT}$, and thus when the panel 100 is applied to a pipeline 200, as shown in FIG. 11, both lower surfaces 121, 131 of both the longitudinal valleys 120 and transverse valleys 130, respectively, conformingly contact an outer surface of the pipeline 200. In some embodiments, alternatively, the longitudinal valley depth $d_{VL}$ is less than the transverse valley depth $d_{VT}$, and thus while the lower surfaces 131 of the transverse valleys 131 contact the outer surface 201 of the pipeline 200, longitudinal channels are formed between the lower surfaces 121 of the longitudinal valleys 120 and the outer surface 201 of the pipeline 200. In some embodiments, alternatively, the transverse valley depth $d_{VT}$ is less than the longitudinal valley depth $d_{VL}$, and thus while the lower surfaces 121 of the longitudinal valleys 121 contact the outer surface 201 of the pipeline 200, transverse channels are formed between the lower surfaces 131 of the transverse valleys 130 and the outer surface 201 of the pipeline 200. In some embodiments, the lower surface 131 of the transverse valleys 130 is spaced from the outer surface 201 of the pipeline 200 by about 0.6 cm. In some embodiments, the longitudinal valley depth $d_{VL}$ is between 3.8 cm and 4.4 cm. In some embodiments, the transverse valley depth $d_{VT}$ is between 3.2 cm and 3.8 cm.

In some embodiment above, the transverse channels may advantageously provide drainage of liquid, such as water, trapped between the pipeline 200 and the panel 100, transversely along the panel 100, and from panel 100 to panel 100 toward a bottom 202 of the pipeline 200. In embodiments where the transverse valleys 130 are shallower than the longitudinal valleys 120, that is the transverse valley depths $d_{VT}$ are less than the longitudinal valley depths $d_{VL}$, a shoulder is formed at the intersection of each longitudinal valley 120 and transverse valley 130, where shoulder height $h_S$ of the shoulder is equal to $h_S=d_{VL}-d_{VT}$. One or more of the shoulders may be formed with a drainage opening to enable flow of any liquids, such as water, out of the neighbouring transverse channel. In this way, a network of transverse channels may be formed which together channel any water or other liquid trapped between the panels 100 and the pipeline 200 toward and out drainage openings at or near the bottom 202 of the pipeline 200. The drainage openings may also enable the flow of liquid, such as water, such as groundwater, in and out of contact with the pipeline to provide or facilitate a cathodic protection current to enable or facilitate cathodic protection of the pipeline in cooperation with a cathodic protection system including an appropriate pipeline coating, as is known in the art.

In some embodiments, the one or more ribs 110 may each have a transverse ridge 117 which may extend the entire width of the rib 110 or part of the width of the rib 110. The ridge 117 may include a slot, or other opening. The transverse ridge 117 may be positioned at any suitable longitudinal position along the length of the rib 110, and in some embodiments is positioned halfway along the length of the rib 110. The transverse ridge 117 may have a transverse ridge depth $d_{RT}$ below an upper surface 115 of the rib 110. The transverse ridge depth $d_{RT}$ may be less than the transverse valley depth $d_{VT}$ and/or the longitudinal valley depth $d_{VL}$. In some embodiments, the transverse ridge depth $d_{RT}$ is between 6.35 mm and 9.52 mm. The transverse ridge 117 may provide structural rigidity to the rib 110, and may also facilitate longitudinal flexure, or bending of the panel 100 at the rib 110. This may enable, improve, or optimize conformity of the panel 110 to the pipeline 200 with respect to longitudinal curvature of the pipeline 200 or bending movement of the pipeline 200 during installation or afterward. The transverse ridge 117 may also form openings, such as holes or slots, to permit the flow of liquid, such as water, from the space formed beneath the rib 110, and thus away from the pipeline 200. The holes or slots may also enable the flow of liquid, such as water, such as groundwater, in and out of contact with the pipeline to provide or facilitate a cathodic protection current, as described above. One or more ribs 100 may be formed with a ridge rib height $h_R R$, being a height of the rib 100 about the location of the ridge 117, which is greater than an end rib height $h_R E$, which is a height of the rib 100 at one or both ends of the rib 100, and thus the rib 100 peaks at the ridge 117. Providing such a peaked rib 100 may provide further structural protection and strength, and moreover where the ridge 117 forms openings, such as holes or slots, internal slopes in the rib 110 formed as a result of the differences in heights $h_R R$ and $h_R E$ may facilitate, in ribs 110 located below a vertical center of if the pipeline 200, flow of water toward the opening formed at the ridge 117, and thus further facilitate drainage of water out of the pipeline shield 300 and away from the pipeline 200.

When the groups of ribs 110 are offset longitudinally, such that discontinuous transverse valleys 130 are formed, the pipeline shield formed by assembly of a plurality of the panels 100 possesses certain advantageous properties when roller cradles are employed to lower the pipeline 200 into a trench. Specifically, if the panels 100 possessed continuous transverse valleys 130, then the assembled pipeline shield might not present a generally regular circumferential surface, but at certain longitudinal positions might possess circumferential valleys which could impede smooth rolling of the pipeline in the roller cradle. By staggering the longitudinal positions of longitudinally-aligned groups of ribs 110, such circumferential valleys may be avoided, thereby improving the ease of rolling of the enveloped pipeline in the roller cradle.

Moreover, in embodiments where the ribs 110 have a generally rectangular shape aligned longitudinally with the longitudinal axis L of the panel 100, the panel 100 may have better flexibility to bending about the longitudinal axis L and along the transverse axis T, thereby facilitating bending of the panel 100 to conform to the curvature C of the pipeline 200. This may be an advantage over other drainage pipes or pipeline shields having circumferential ridges which, while they might provide improved strength to retain a circular shape, might resist bending to form different curvatures, and therefore may require a more precise preconfigured fit to the pipeline.

The pipeline shield 300 may be formed by assembly of a plurality of panels 100 on the pipeline either prior to delivery of the pipeline 200 to the installation location or alternatively at the delivery location. The latter option possesses the advantages of simplified transportation, inasmuch as the panels may be readily and conveniently stacked, bundled, crated, and otherwise prepared for transport to the installation site. The mating ridges 150, 151, 160, 161 with holes 152, 162 and plugs enable convenient assembly of the panels 100 onsite to form the pipeline shield 300, with any desired or suitable configuration or pattern of assembly.

The pipeline shield 300 may be formed on the pipeline 200 at any suitable time or condition, for example following welding and/or weld joint coating of pipes forming the pipeline, and prior to the pipe section being lowered in the trench.

Moreover, assembly of the pipeline shield 300 from a plurality of modular panels 100 enables the provision of pipeline shields 300 for a variety of different pipeline 200 dimensions, while using the same panels 100 of common dimensions, or a limited number of different dimensions. For example, panels 100 having panel width $w_P$ may be used to assemble pipeline shields 300 for pipelines 200 having a circumference which is any multiple of the panel width $w_P$, including, for example, a circumference of $w_P$, using a single row of panels 100 (i.e. each individual panel 100 can be wrapped fully around the entire circumference of the pipeline 200), or $2 \times w_P$, using two rows of panels 100, or $3 \times w_P$, using three of panels 100, and so forth. If the pipeline 200 has a circumference which is not a whole multiple of the panel width $w_P$, then two or more sets of panels 100 may be used having different panel widths $w_P A \neq w_P B \neq w_P C$, etc. For example, if the pipeline 200 has a circumference of $3 \times w_P A + w_P B$, then the pipeline shield 300 may be assembled using 3 rows of panels having panel width $w_P A$, and one row of panels having panel width $w_P B$. By providing the panels with mating ridges 150, 151, 160, 161 having holes 152, 162 and plugs with common, standardized sizes, shapes, and spacings, a variety of sizes, and in some embodiments shapes, of panels 100 may be employed to assemble a pipeline shield 300 for pipelines 200 of various dimensions.

The pipeline shield 300 so assembled enveloping a pipeline 200 may be effective to provide structural protection to the pipeline 200 from external impact or abrasion by rocks, sand, soil, or other substances. By providing drainage channels both outside the shield 300 and between the shield 300 and pipeline 200, including drainage of water away from the pipeline 200, the shield may reduce the risk of corrosion. In some embodiments, the panels 100 may have a colour, such as bright yellow, or other visual characteristic which provides improved visibility of the pipeline shield 300 and therefore the protected pipeline 200.

Figure 13:
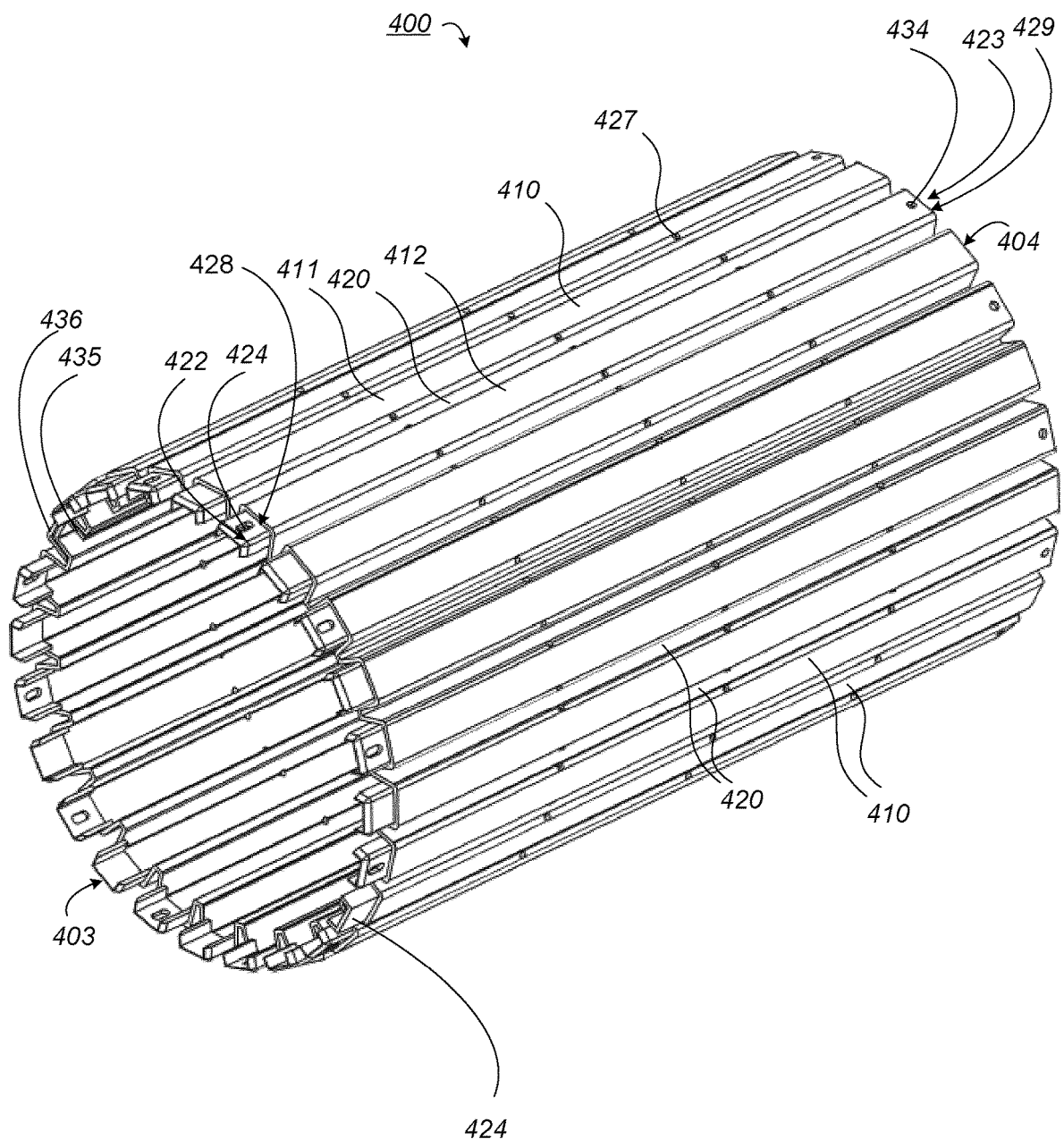
FIG. 13 shows an upper perspective view of a modular pipeline shield panel according to embodiments of the invention.
Figure 14:
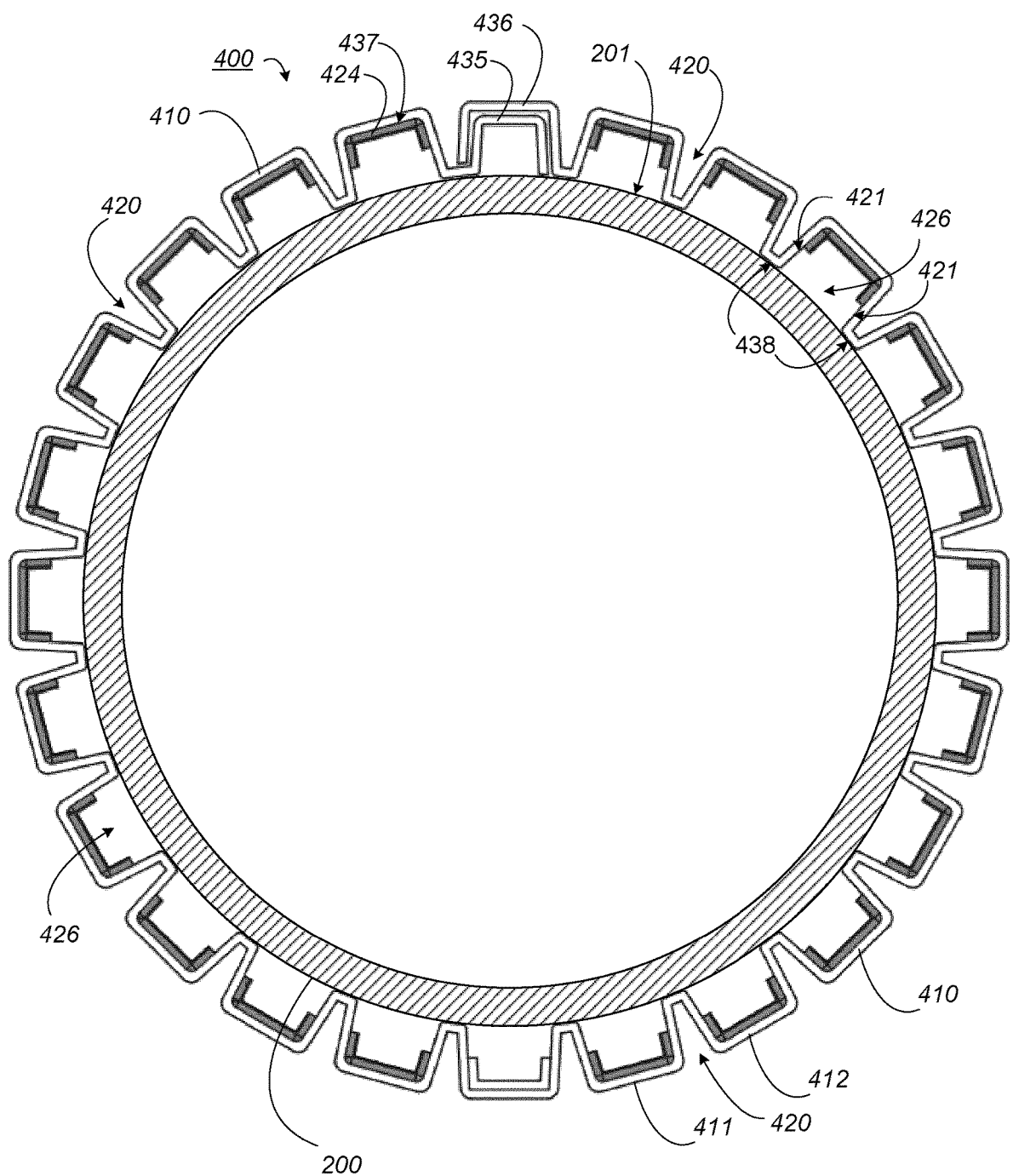
FIG. 14 shows an end view of the modular pipeline shield panel of FIG. 13.
Figure 15:
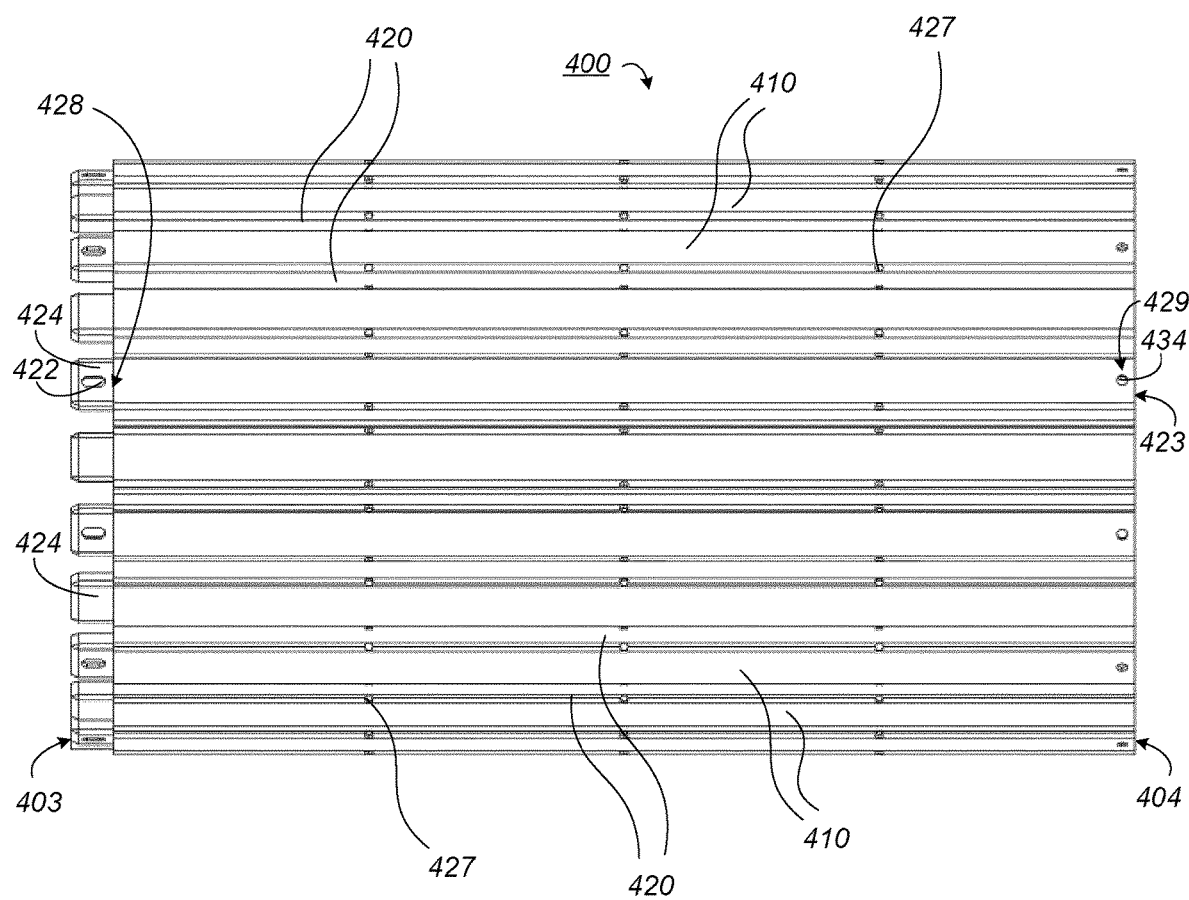
FIG. 15 shows a side view of the modular pipeline shield panel of FIG. 13.

Another embodiment of a modular pipeline shield panel 400 is shown in FIGS. 13-15. The panel 400 is similar in many respects to the panel 100 shown in FIGS. 1-8, except instead of ribs 110 separated longitudinally by transverse valleys 130, the panel 400 has ribs 410 which are not separated longitudinally by transverse valleys, but instead extend continuously between opposite longitudinal ends 403, 404 of the panel 400. In addition, at least one, at least some, or all of the ribs 410 may be free of any transverse ridge, such as the transverse ridge 117 of the panel 100 described above. Similar to panel 100, this panel 400 may have longitudinal valleys 420, similar to longitudinal valleys 120, which separate pairs of transversely adjacent ribs 411, 412.

At least one, or at least some, or all of the ribs 410 may be formed with at least one drainage opening 427 to enable passage of any liquids, such as water, out of longitudinal channels 426 (shown in FIG. 14) defined by an inner surface 421 of the rib 410 and an outer surface of the pipeline 200, in order to remove the liquid from the surface of the pipeline, to eliminate reduce corrosion or other damage, or to provide ventilation. The drainage openings may also enable the flow of liquid, such as water, such as groundwater, in and out of contact with the pipeline to provide or facilitate a cathodic protection current to enable or facilitate cathodic protection of the pipeline in cooperation with a cathodic protection system including an appropriate pipeline coating, as is known in the art.

At least one, or at least some, or all of the ribs 410, may be formed with, or coupled with, a coupling tongue 424 which may be formed integrally with the rib 410, or may be affixed at an underside 437 of the rib 410, for example by fastening using fasteners or by cementing using cement or glue. The coupling tongue 424 may extend longitudinally beyond a longitudinally first end 428 of the rib 410. At a longitudinally opposite second end 429 of the rib 410, the channel 426 formed by the rib 410 at that end may be sized and shaped to form a coupling slot 423 configured to receive the coupling tongue 424 of another, longitudinally adjacent rib 410 of a longitudinally adjacent panel 400, in overlapping arrangement. In at least some instances, the coupling tongue 424, the coupling slot 423, the first end 428 of one panel 400, and/or the second end 429 of a second panel 400, may be formed with or configured to cooperate with a securing device to secure, affix, or attach the coupling tongue 424 of the rib 410 of a first panel 400 to the coupling slot 423 of the rib 410 of a second, longitudinally adjacent panel. As shown, the securing device may include a first opening 422 formed in the coupling tongue 424, a second opening 434 formed in the coupling slot, which align when the coupling tongue is inserted in the coupling slot. The securing device may further include a fastener such as a button, bolt, low profile plug, cable tie, zip tie, or other device to fasten or affix the overlapping panels 400 together at the overlapping portion, by passing the fastener through the aligned first opening 422 and second opening 434.

As shown, a plurality of the ribs 410 may have the coupling tongue 424 and coupling slot 423 at opposite ends, and thus longitudinally adjacent and aligned panels 400 may be coupled and affixed together by coupling respectively adjacent coupling tongues 424 and coupling slots 423 in the manner described above. In different embodiments, the coupling tongues 424 and coupling slots 423 may be on the same, or different, ribs 410. At least one, or at least some, of the ribs 410 may be free of any coupling tongue 424. Moreover, at least one, or at least some, or all of the coupling tongues 424 may be free of the first opening 422, and at least one, or at least some, or all of the coupling slots 423 may be free of the second opening 434.

As shown in FIGS. 13-15, the panel 400 may be sized and shaped so as to be rolled or formed by bending into a cylindrical tube. As with panels 100, the panel 400 may be formed in such a way as to be flexible and bendable about a longitudinal axis of the panel 400, thus permitting formation by bending into the cylindrical tube. One of the ribs 410 at one transverse edge of the panel 400 may be an inner coupling rib 435, sized and shaped so as to fit conformably with an underside of an outer coupling rib 436, disposed at a transversely opposite edge of the panel 400. In this way, the inner coupling rib 435 and outer coupling rib 436 may be arranged in overlapping arrangement, as shown particularly in FIG. 14. The inner coupling rib 435 and outer coupling rib 436 may be provide or formed with, or cooperate with, fastening means to fasten the inner coupling rib 435 and outer coupling rib 436 together, thereby rigidly to form the panel 400 into a cylindrical shape.

The panel 400 may be sized and shaped such in the cylindrical shape it conforms to an outer surface 201 of a pipeline 200 based on preconfigured or predetermined dimensions of the pipeline 200, which may include a diameter of the pipeline 200, such that lower surfaces 438 of the longitudinal valleys 420 fittingly contact the outer surface 201 of the pipeline.

Figure 16:
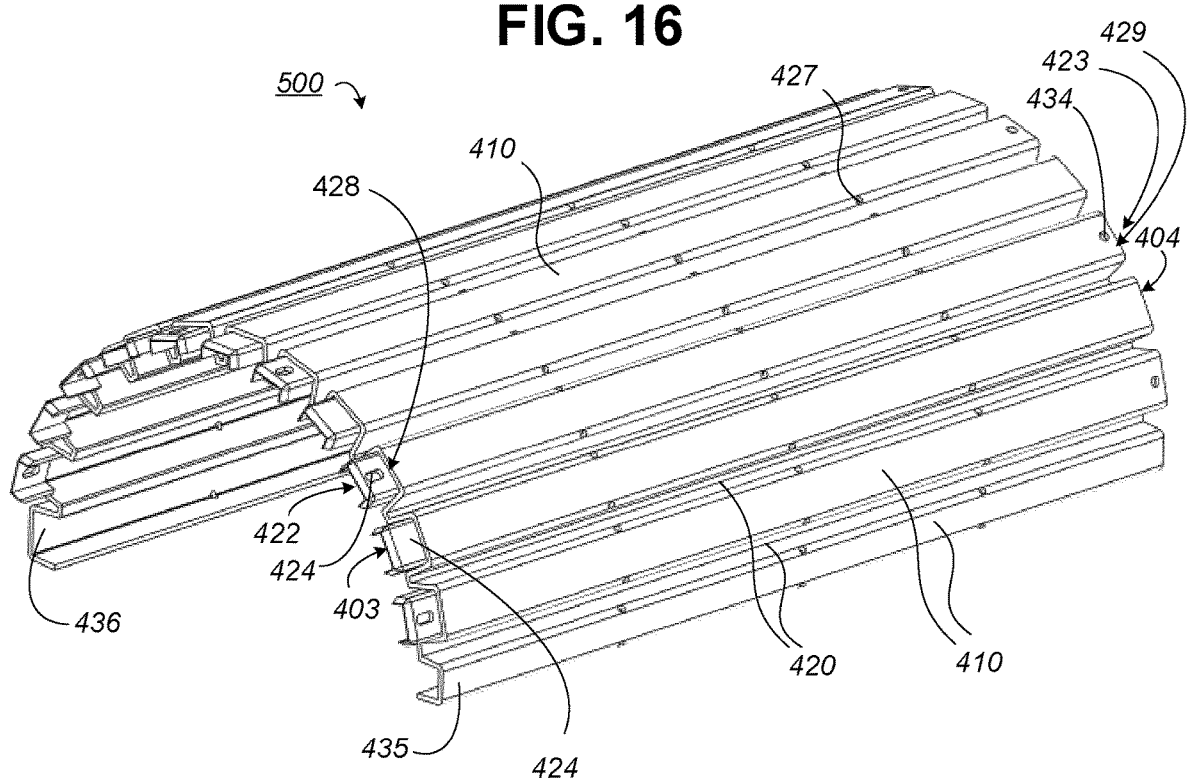
FIG. 16 shows an upper perspective view of a modular pipeline shield panel according to embodiments of the invention.
Figure 17:
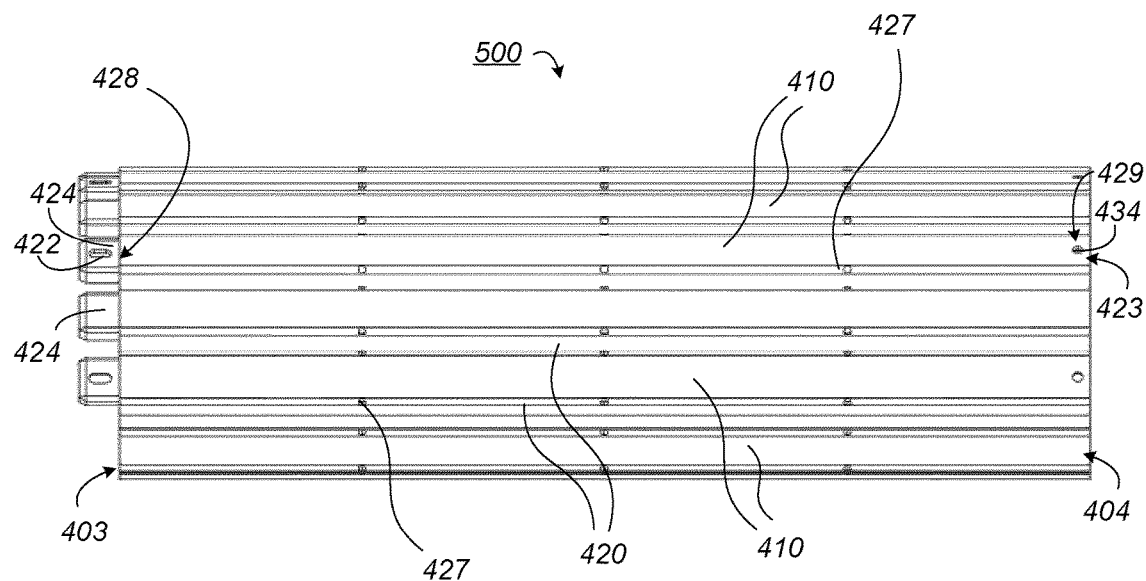
FIG. 17 shows a side view of the modular pipeline shield panel of FIG. 16.
Figure 18:
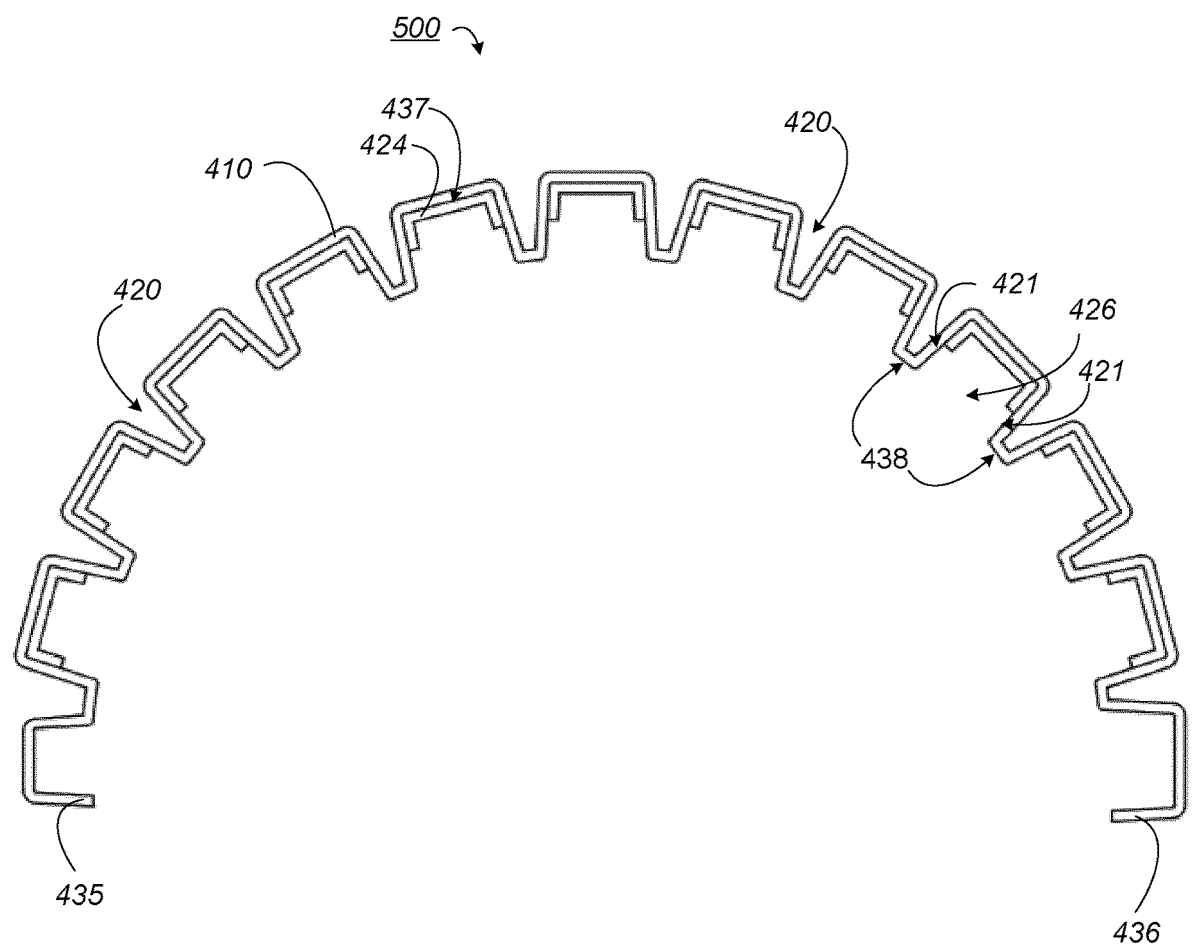
FIG. 18 shows an end view of the modular pipeline shield panel of FIG. 16.
Figure 19:
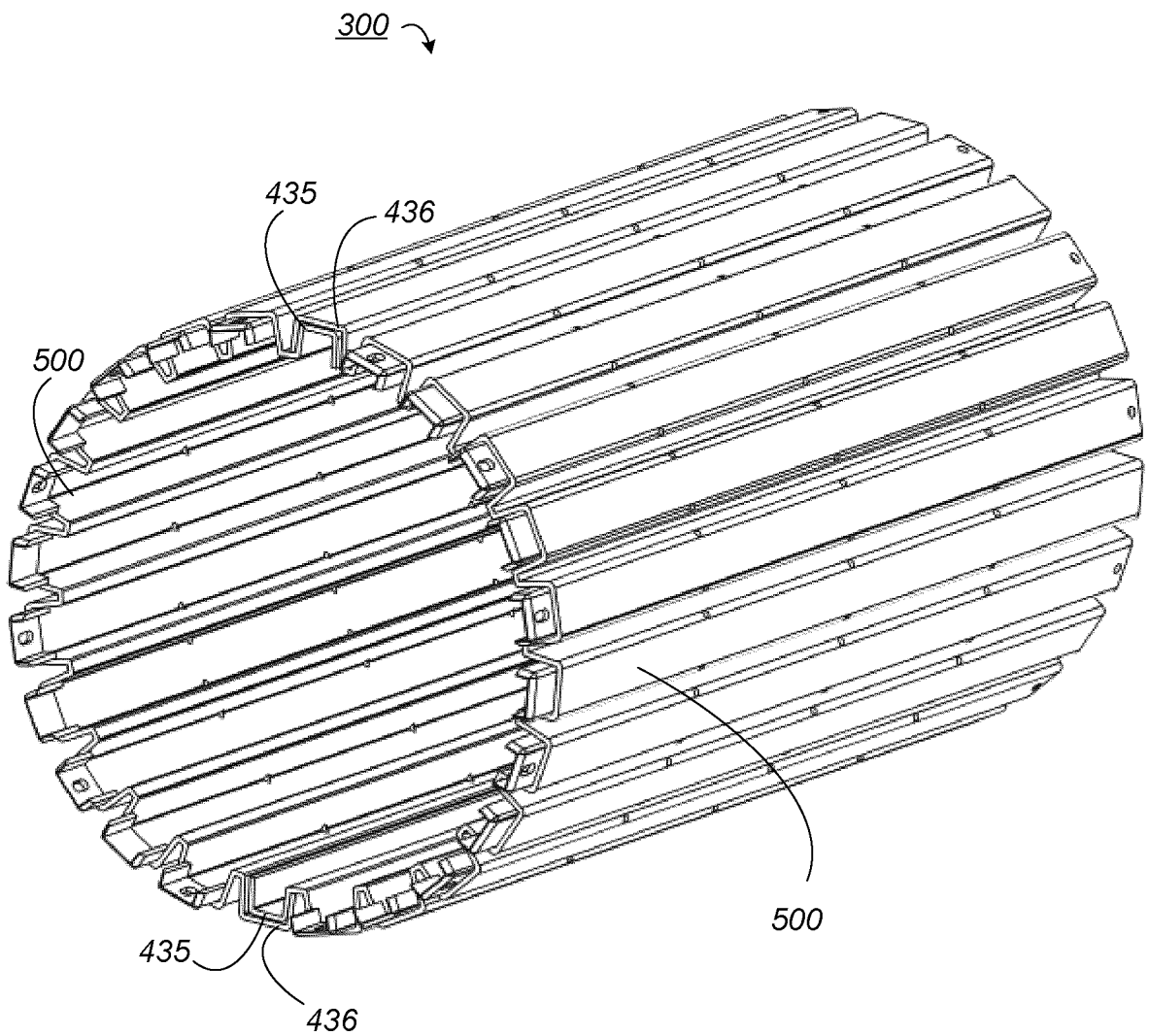
FIG. 19 shows an upper perspective view of a cylindrical tube portion of a pipeline shield formed by assembling two modular pipeline shield panels of FIG. 16.

FIGS. 16 & 17 shown another embodiment of a panel 500, which is similar to panel 400, but instead may be sized and shaped so as to be rolled or formed by bending into a portion less than an entirety of a cylindrical tube, specifically a cylindrical tube sector, being that portion of a cylindrical tube bounded by a particular angular sector. In the particular example shown in FIGS. 16 & 17, the angular sector is 180°, or half, of a cylindrical tube. The panel 500 may otherwise be essentially the same as or similar to panel 400 as described above, which may be considered a special case of panel 500 where the angular sector is 360°, i.e. the entire cylindrical tube. Where the angular sector is less than 360°, more than one panel 500 may be assembled to form the cylindrical tube, by overlapping the inner coupling rib 435 of each panel 500 with the outer coupling rib 436 of another panel 500, substantially as described above. This is shown in FIG. 19, where the panels 500 are each characterized by angular sectors of 180°.

In general, any number of panels may be provided characterized by the same, or different, angular sectors, so long as when assembled they together form a cylindrical tube. For example, two panels may be provided which are characterized by angular sectors of 90° each, and a third panel may be provided which is characterized by an angular sector of 180°, and these together may be assembled substantially as described above to form a cylindrical tube. Other dimensions and arrangements are possible. The ability to provide and assemble numerous such panels, of the same or different dimensions, provides flexibility to assemble a suitable pipeline shield onsite based on the dimensions of the pipeline.

The panels assembled as described above, with either a single panel 400 rolled or formed by bending into a cylindrical tube, or by assembly of multiple panels 500 into a cylindrical tube, and assembled with yet further such panels in a similar manner lengthwise, may together form an embodiment of the pipeline shield 300. The panel 400, ribs 410, longitudinal valleys 420, and other aspects may have or be characterized by substantially the same dimensions, properties, compositions, and relationships as described above in connection with the panel 100, ribs 110, and longitudinal valleys 120, and other aspects, respectively. In particular, in some embodiments, a transverse spacing between the longitudinal valleys 420 may be about 3.14" (about 8 cm), or a multiple thereof. The weight of each panel 400 may be at most 60 lbs (about 27 kgs).

A further advantage of the panels 400, 500 is the ability to form them by extrusion, inasmuch as they may possess a generally continuous transverse profile, except only the coupling tongues 424.

The following are examples of containers according to the disclosure herein.

Example 1

A modular pipeline shield panel comprising: a generally rectangular sheet of durable material formed or formable into a generally arcuate shape having a plurality of longitudinal ribs projecting from a surface of the sheet and defining a plurality of longitudinal valleys between transversely adjacent longitudinal ribs, and coupling means configured for secure assembly with at least one other modular pipeline shield panel to form a generally tubular pipeline shield.

Example 2

The modular pipeline shield panel according to Example 1, wherein the longitudinal ribs extend substantially an entire length of the modular pipeline shield panel.

Example 3

The modular pipeline shield panel according to Example 2, wherein the coupling means comprise at least one coupling tongue extending longitudinally at a first end of a corresponding first longitudinal rib, and at least one coupling slot formed at a second end of a corresponding second longitudinal rib, wherein the first end is longitudinally opposite the second end.

Example 4

The modular pipeline shield panel according to Example 3, wherein the second longitudinal rib is the first longitudinal rib.

Example 5

The modular pipeline shield panel according to Example 2, wherein the coupling means comprise a plurality of coupling tongues each extending longitudinally at a first end of a respectively corresponding first longitudinal rib, and a plurality of coupling slots each formed at a second end of a respectively corresponding second longitudinal rib, wherein the first end is longitudinally opposite the second end.

Example 6

The modular pipeline shield panel according to any one of Examples 3 to 5, wherein the respective coupling tongues and coupling slots of the modular pipeline shield panel and another modular pipeline shield panel are sized, shaped, and positioned for longitudinal coupling of the modular pipeline shield panel and other modular pipeline shield panel.

Example 7

The modular pipeline shield panel according to any one of Examples 1 to 6, wherein at least one of the longitudinal ribs comprises at least one drainage hole sized, shaped, and positioned for drainage of fluid in a channel formed at an underside of the longitudinal rib.

Example 8

The modular pipeline shield panel according to any one of Examples 2 to 7 formed or bendably formable into a cylindrical tube.

Example 9

The modular pipeline shield panel according to Example 8, wherein a first longitudinal rib at a first edge of the modular pipeline shield panel is an outer coupling rib, and a second longitudinal rib at a second edge of the modular pipeline shield panel transversely opposite the first edge is an outer coupling rib, wherein the inner coupling rib is sized and shaped for conformable nesting with the outer coupling rib at an underside of the outer coupling rib, such that the modular pipeline shield panel is formed or bendably formable into the cylindrical tube when the inner coupling rib is conformably nested in the underside of the outer coupling rib.

Example 10

The modular pipeline shield panel according to any one of Example 2 to 7 formed or bendably formable into a portion of a cylindrical tube.

Example 11

The modular pipeline shield panel according to Example 10, wherein the portion of the cylindrical tube is characterized by an angular sector of 180°.

Example 12

The modular pipeline shield panel according to Example 10, wherein the portion of the cylindrical tube is characterized by an angular sector different from 180°.

Example 13

The modular pipeline shield panel according to Example 10, wherein a first longitudinal rib at a first edge of the modular pipeline shield panel is an outer coupling rib, and a second longitudinal rib at a second edge of the modular pipeline shield panel transversely opposite the first edge is an outer coupling rib, wherein the inner coupling rib is sized and shaped for conformable nesting with the outer coupling rib of another modular pipeline shield panel at an underside of the outer coupling rib of the other modular pipeline shield panel, and the outer coupling rib is sized and shaped for conformable nesting with the inner coupling rib of a yet further modular pipeline shield panel at an underside of the outer coupling rib of the modular pipeline shield panel.

Example 14

The modular pipeline shield panel according to Example 13, wherein the yet further modular pipeline shield panel is the other modular pipeline shield panel, and the modular pipeline shield panel and the other modular pipeline shield panel when assembled form the cylindrical tube.

Example 15

The modular pipeline shield panel according to any one of Example 2 to 14 formed by extrusion.

Example 16

The modular pipeline shield panel according to Example 1, wherein at least one of the longitudinal ribs extends less than an entire length of the modular pipeline shield panel.

Example 17

The modular pipeline shield panel according to Example 16, wherein respective rib lengths of the longitudinal ribs are greater than respective rib widths of the longitudinal ribs.

Example 18

The modular pipeline shield panel according to Example 16, wherein groups of longitudinally aligned longitudinal ribs are staggered longitudinally.

Example 19

The modular pipeline shield panel according to Example 16, wherein longitudinally adjacent longitudinal ribs define transverse valleys.

Example 20

The modular pipeline shield panel according to Example 19, wherein a transverse valley depth of the transverse valleys is less than a longitudinal valley depth of the longitudinal valleys.

Example 21

The modular pipeline shield panel according to Example 19, wherein, when the pipeline shield is applied to a pipeline, the transverse valleys are spaced radially from an outer surface of the pipeline thereby forming transverse channels between the pipeline and the modular pipeline shield.

Example 22

The modular pipeline shield panel according to Example 21, wherein at least one intersecting longitudinal valley and transverse valley forms a shoulder, and a drainage hole is formed in the shoulder to permit drainage of liquids from the transverse channel.

Example 23

The modular pipeline shield panel according to Example 1, wherein coupling means comprise mating ridges forming spaced holes configured to fittingly receive plugs, wherein one of the mating ridges is configured for overlap with a mating ridge of the at least one other modular pipeline shield panel and alignment of the spaced holes with spaced holes in the at least one other modular pipeline shield panel, wherein the aligned spaced holes are configured to fittingly receive the plugs to securely assemble the modular pipeline shield panel and the at least one other modular pipeline shield panel.

Example 24

The modular pipeline shield panel according to any one of Examples 1 to 23, wherein the material comprises high-density polyethylene.

Example 25

A tubular pipeline shield comprising a plurality of the modular pipeline shield panels defined by any one of Examples 1 to 24 securely assembled at abutting edges to form a generally tubular shape.

Example 26

A method of protecting a pipeline comprising forming the tubular pipeline shield defined by Example 25 so as conformably to envelope the pipeline.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A modular pipeline shield panel comprising:
a generally rectangular sheet of durable material formed or formable into a generally arcuate shape having a plurality of longitudinal ribs projecting from a surface of the sheet and defining a plurality of longitudinal valleys between transversely adjacent longitudinal ribs, and coupling means configured for secure assembly with at least one other modular pipeline shield panel to form a generally tubular pipeline shield, wherein an underside of at least one of the longitudinal ribs defines a longitudinal channel;
wherein the longitudinal ribs extend substantially an entire length of the modular pipeline shield panel; and
wherein the coupling means comprise at least one coupling tongue extending longitudinally at a first end of a corresponding first longitudinal rib, and at least one coupling slot formed at a second end of a corresponding second longitudinal rib, wherein the first end is longitudinally opposite the second end.

2. The modular pipeline shield panel according to claim 1, wherein the second longitudinal rib is the first longitudinal rib.

3. The modular pipeline shield panel according to claim 1 formed or bendably formable into a cylindrical tube.

4. A modular pipeline shield panel comprising:
a generally rectangular sheet of durable material formed or bendably formable into a cylindrical tube having a plurality of longitudinal ribs projecting from a surface of the sheet and defining a plurality of longitudinal valleys between transversely adjacent longitudinal ribs, and coupling means configured for secure assembly with at least one other modular pipeline shield panel to form a generally tubular pipeline shield, wherein an underside of at least one of the longitudinal ribs defines a longitudinal channel;

wherein the longitudinal ribs extend substantially an entire length of the modular pipeline shield panel; and wherein a first longitudinal rib at a first edge of the modular pipeline shield panel is an outer coupling rib, and a second longitudinal rib at a second edge of the modular pipeline shield panel transversely opposite the first edge is an inner coupling rib, wherein the inner coupling rib is sized and shaped for conformable nesting with the outer coupling rib at an underside of the outer coupling rib, such that the modular pipeline shield panel is formed or bendably formable into the cylindrical tube when the inner coupling rib is conformably nested in the underside of the outer coupling rib.

5. The modular pipeline shield panel according to claim 4, wherein at least one of the longitudinal ribs comprises at least one drainage hole sized, shaped, and positioned for drainage of fluid in a channel formed at an underside of the longitudinal rib.

6. The modular pipeline shield panel according to claim 1 formed or bendably formable into a portion of a cylindrical tube.

7. The modular pipeline shield panel according to claim 6, wherein the portion of the cylindrical tube is characterized by an angular sector of 180°.

8. The modular pipeline shield panel according to claim 6, wherein the portion of the cylindrical tube is characterized by an angular sector different from 180°.

9. A modular pipeline shield panel comprising:
a generally rectangular sheet of durable material formed or bendably formable into a portion of a cylindrical tube having a plurality of longitudinal ribs projecting from a surface of the sheet and defining a plurality of longitudinal valleys between transversely adjacent longitudinal ribs, and coupling means configured for secure assembly with at least one other modular pipeline shield panel to form a generally tubular pipeline shield, wherein an underside of at least one of the longitudinal ribs defines a longitudinal channel;

wherein the longitudinal ribs extend substantially an entire length of the modular pipeline shield panel; and wherein a first longitudinal rib at a first edge of the modular pipeline shield panel is an outer coupling rib, and a second longitudinal rib at a second edge of the modular pipeline shield panel transversely opposite the first edge is an inner coupling rib, wherein the inner coupling rib is sized and shaped for conformable nesting with the outer coupling rib of another modular pipeline shield panel at an underside of the outer coupling rib of the other modular pipeline shield panel, and the outer coupling rib is sized and shaped for conformable nesting with the inner coupling rib of a yet further modular pipeline shield panel at an underside of the outer coupling rib of the modular pipeline shield panel.

10. The modular pipeline shield panel according to claim 9, wherein the yet further modular pipeline shield panel is the other modular pipeline shield panel, and the modular pipeline shield panel and the other modular pipeline shield panel when assembled form the cylindrical tube.

11. A modular pipeline shield panel comprising:
a generally rectangular sheet of durable material formed or formable into a generally arcuate shape having a plurality of longitudinal ribs projecting from a surface of the sheet and defining a plurality of longitudinal valleys between transversely adjacent longitudinal ribs, and coupling means configured for secure assembly with at least one other modular pipeline shield panel to form a generally tubular pipeline shield, wherein an underside of at least one of the longitudinal ribs defines a longitudinal channel; and wherein at least one of the longitudinal ribs extends less than an entire length of the modular pipeline shield panel.

12. The modular pipeline shield panel according to claim 11, wherein respective rib lengths of the longitudinal ribs are greater than respective rib widths of the longitudinal ribs.

13. The modular pipeline shield panel according to claim 11, wherein groups of longitudinally aligned longitudinal ribs are staggered longitudinally.

14. The modular pipeline shield panel according to claim 11, wherein longitudinally adjacent longitudinal ribs define transverse valleys.

15. The modular pipeline shield panel according to claim 14, wherein a transverse valley depth of the transverse valleys is less than a longitudinal valley depth of the longitudinal valleys.

16. The modular pipeline shield panel according to claim 14, wherein, when the pipeline shield is applied to a pipeline, the transverse valleys are spaced radially from an outer surface of the pipeline thereby forming transverse channels between the pipeline and the modular pipeline shield.

17. A modular pipeline shield panel comprising:
a generally rectangular sheet of durable material formed or formable into a generally arcuate shape having a plurality of longitudinal ribs projecting from a surface of the sheet and defining a plurality of longitudinal valleys between transversely adjacent longitudinal ribs, and coupling means configured for secure assembly with at least one other modular pipeline shield panel to form a generally tubular pipeline shield, wherein an underside of at least one of the longitudinal ribs defines a longitudinal channel; and wherein coupling means comprise mating ridges forming spaced holes configured to fittingly receive plugs, wherein one of the mating ridges is configured for overlap with a mating ridge of the at least one other modular pipeline shield panel and alignment of the spaced holes with spaced holes in the at least one other modular pipeline shield panel, wherein the aligned spaced holes are configured to fittingly receive the plugs to securely assemble the modular pipeline shield panel and the at least one other modular pipeline shield panel.

18. A tubular pipeline shield comprising a plurality of the modular pipeline shield panels defined by claim 4 securely assembled at abutting edges to form a generally tubular shape.

19. A method of protecting a pipeline comprising forming the tubular pipeline shield defined by claim 18 so as conformably to envelope the pipeline.

20. The modular pipeline shield panel according to claim 4, wherein, for each of a plurality of the longitudinal ribs, an underside of the longitudinal rib defines a longitudinal channel.

21. The modular pipeline shield panel according to claim 4, wherein, for each and every one of the longitudinal ribs, an underside of the longitudinal rib defines a longitudinal channel.

* * * * *